United States Patent [19]

Silver

[11] Patent Number: 5,700,464
[45] Date of Patent: Dec. 23, 1997

[54] PROCESS FOR EXTRACTING WITH LIQUIDS SOLUBLE SUBSTANCES FROM SUBDIVIDED SOLIDS

[76] Inventor: Barnard Stewart Silver, 4391 Carol Jane Dr., Salt Lake City, Utah 84124-3601

[21] Appl. No.: 653,502

[22] Filed: May 24, 1996

Related U.S. Application Data

[63] Continuation of Ser. No. 443,579, May 17, 1995, abandoned, which is a continuation-in-part of Ser. No. 289,923, Aug. 12, 1994, Pat. No. 5,456,893, which is a continuation-in-part of Ser. No. 106,077, Aug. 13, 1993, abandoned.

[51] Int. Cl.⁶ .................. A61K 38/46; A61K 35/78; A61K 35/12
[52] U.S. Cl. .................. 424/123; 424/195.1; 424/520; 422/268
[58] Field of Search .................. 424/123, 195.1, 424/520; 422/268

[56] References Cited

U.S. PATENT DOCUMENTS

| | | | |
|---|---|---|---|
| 2,451,081 | 10/1948 | Ford | 422/268 |
| 2,502,939 | 4/1950 | Frynta | 127/5 |
| 2,516,968 | 8/1950 | Faler | 422/268 |
| 2,645,589 | 7/1953 | Langen | 127/7 |
| 2,686,192 | 8/1954 | Bonotto | 451/355 |
| 2,713,009 | 7/1955 | Brüniche-Olsen | 127/7 |
| 2,857,907 | 10/1958 | Kaether et al. | 127/7 |
| 2,885,311 | 5/1959 | Brüniche-Olsen et al. | 127/45 |
| 2,950,998 | 8/1960 | Stewart et al. | 127/3 |
| 3,142,589 | 7/1964 | Schaffer et al. | 127/3 |
| 3,147,212 | 9/1964 | Van Koppen et al. | 209/17 |
| 3,195,446 | 7/1965 | French | 100/37 |
| 3,329,541 | 7/1967 | Mears | 216/56 |
| 3,355,260 | 11/1967 | Brüniche-Olsen | 127/43 |
| 3,420,708 | 1/1969 | Schaffer | 127/5 |
| 3,433,598 | 3/1969 | Faaborg-Andersen et al. | 422/268 |
| 3,471,328 | 10/1969 | Brüniche-Olsen | 127/5 |
| 3,565,634 | 2/1971 | Osterman | 426/417 |
| 3,573,982 | 4/1971 | Silver | 127/5 |
| 3,971,682 | 7/1976 | Frantzen et al. | 156/11 |
| 4,013,498 | 3/1977 | Frantzen et al. | 156/345 |
| 4,101,285 | 7/1978 | Tilby | 23/270 B |
| 4,124,437 | 11/1978 | Bond et al. | 156/640 |
| 4,751,060 | 6/1988 | Kratochwill | 422/268 |
| 4,857,279 | 8/1989 | Kawamata et al. | 422/268 |
| 4,956,176 | 9/1990 | Moorman | 426/478 |
| 5,207,904 | 5/1993 | Abel | 210/256 |

OTHER PUBLICATIONS

Milner, "Selection of Proper Working Screens For Continuous Sugar Centrifugals," 1992.

*Primary Examiner*—John W. Rollins
*Attorney, Agent, or Firm*—Brinks Hofer Gilson & Lione

[57] ABSTRACT

Small particles and fines included along with larger subdivided solids are treated with liquid to extract soluble solids therein in a process using milli-screens with milli-sized openings of less than about 0.095 inches across. The milli-screen openings may be kept open for the passage of liquids with specially-designed wipers and/or back-flushing from a liquid compartment and/or rotation of the milli-screen past the matrix of subdivided solids, the subdivided solids themselves acting as a screen cleaner. The invention is useful in batch or continuous diffusers for extracting soluble solids from subdivided solids containing small particles and fines.

42 Claims, 20 Drawing Sheets

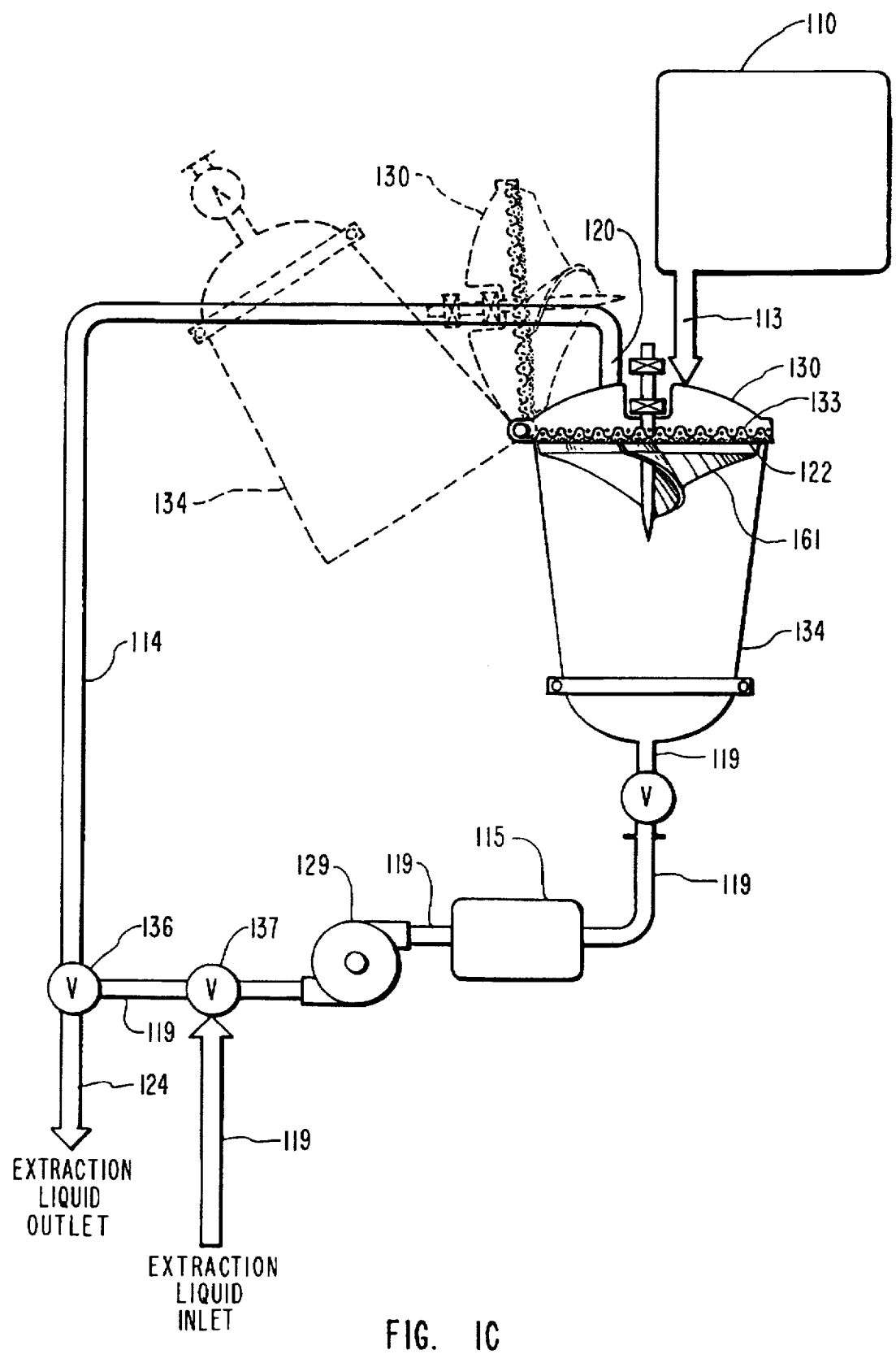
FIG. IC

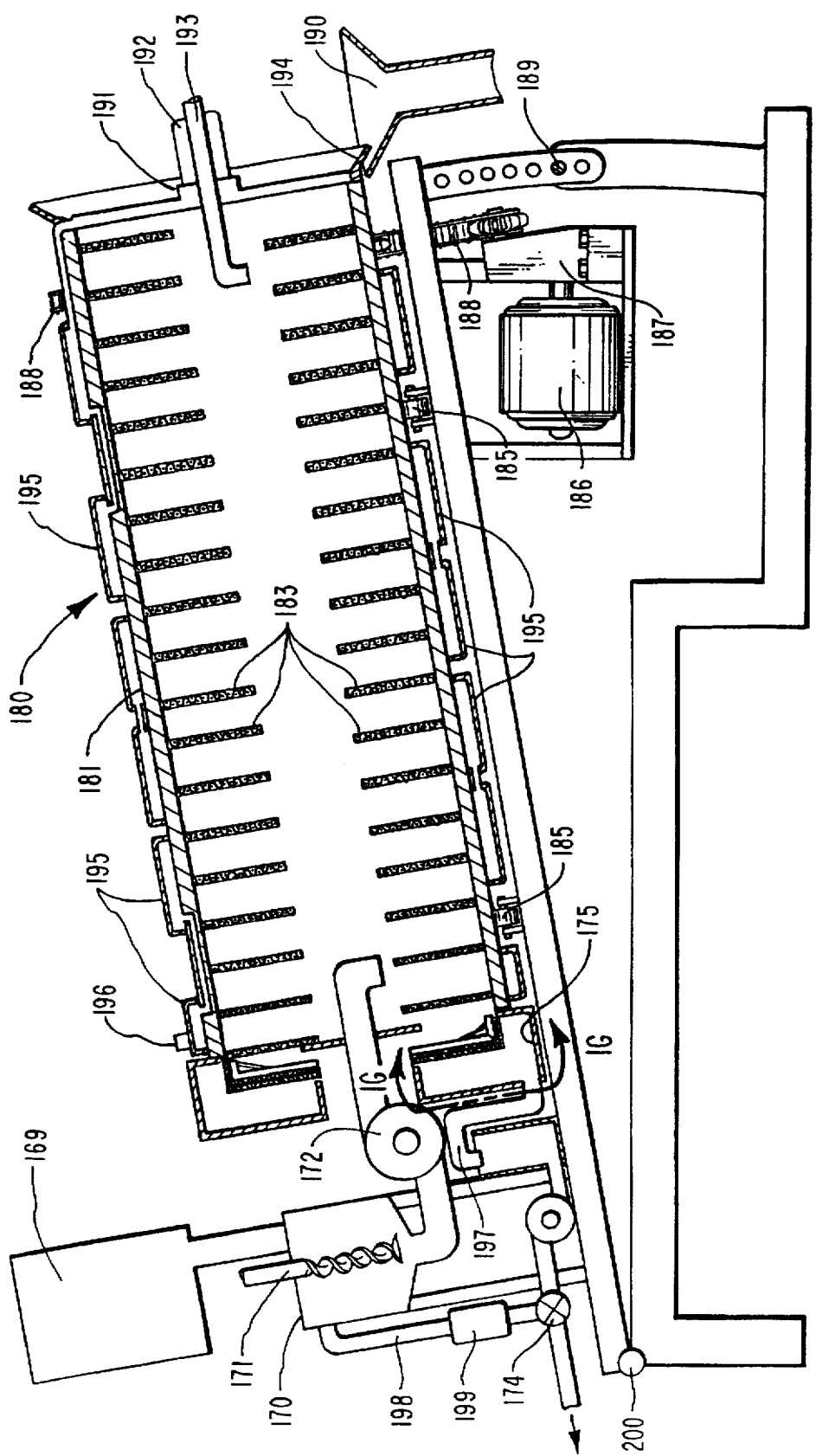
FIG. IF

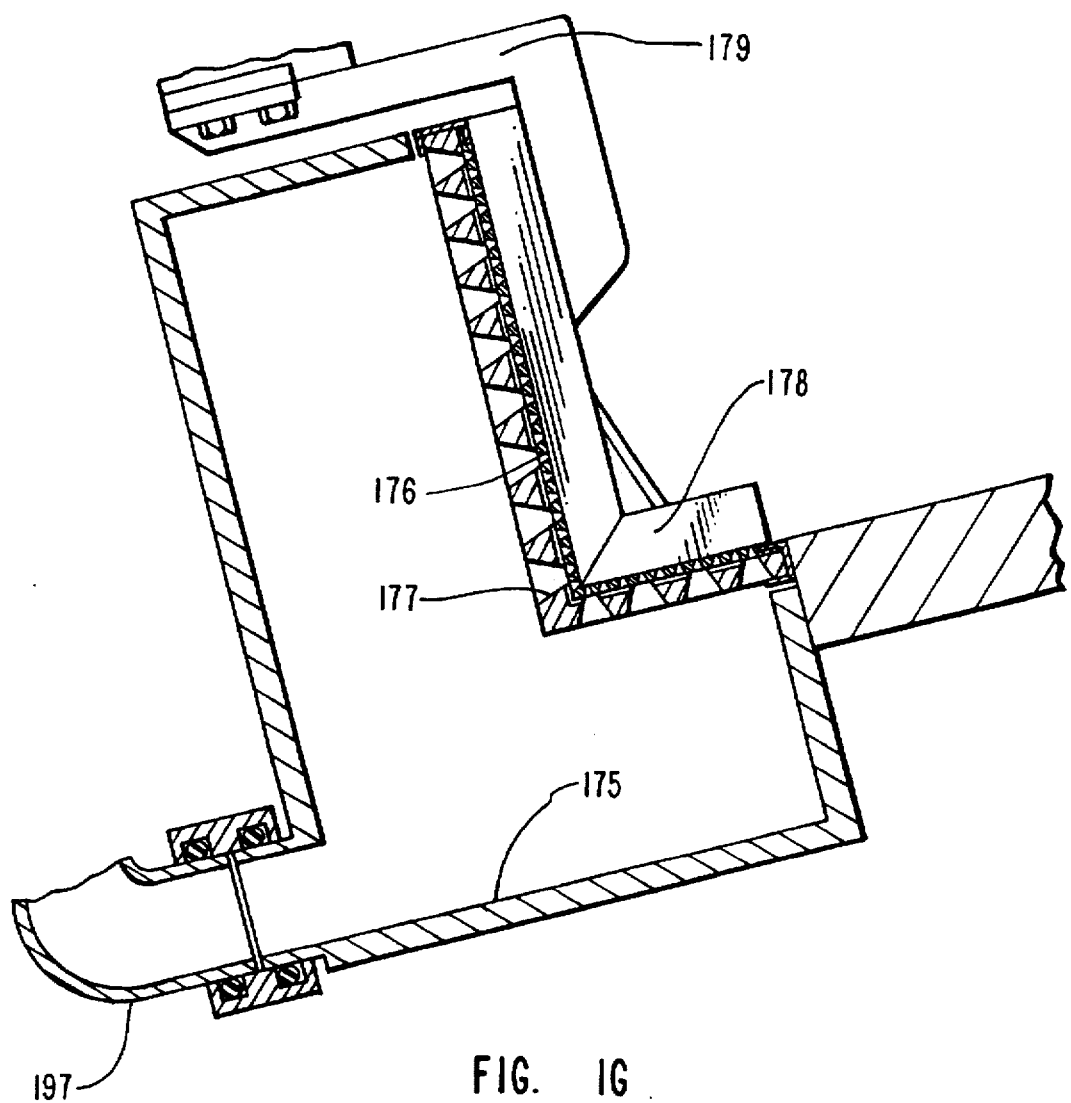
FIG. IG

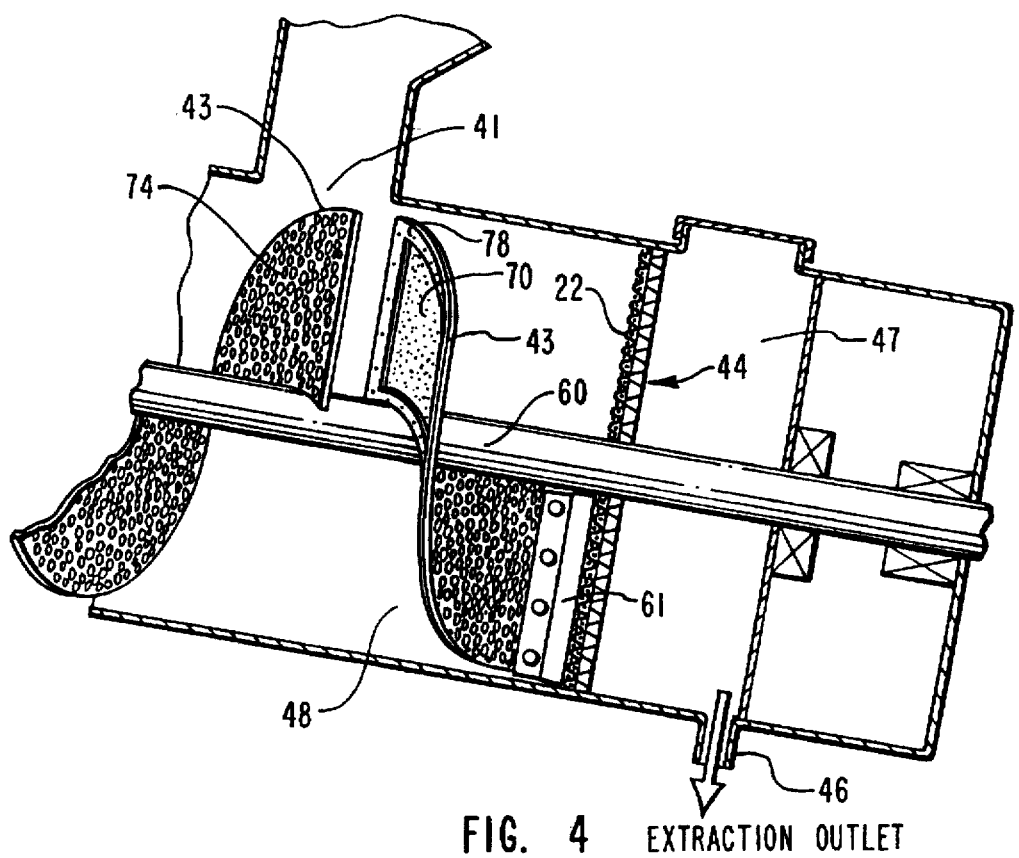
FIG. 4 EXTRACTION OUTLET
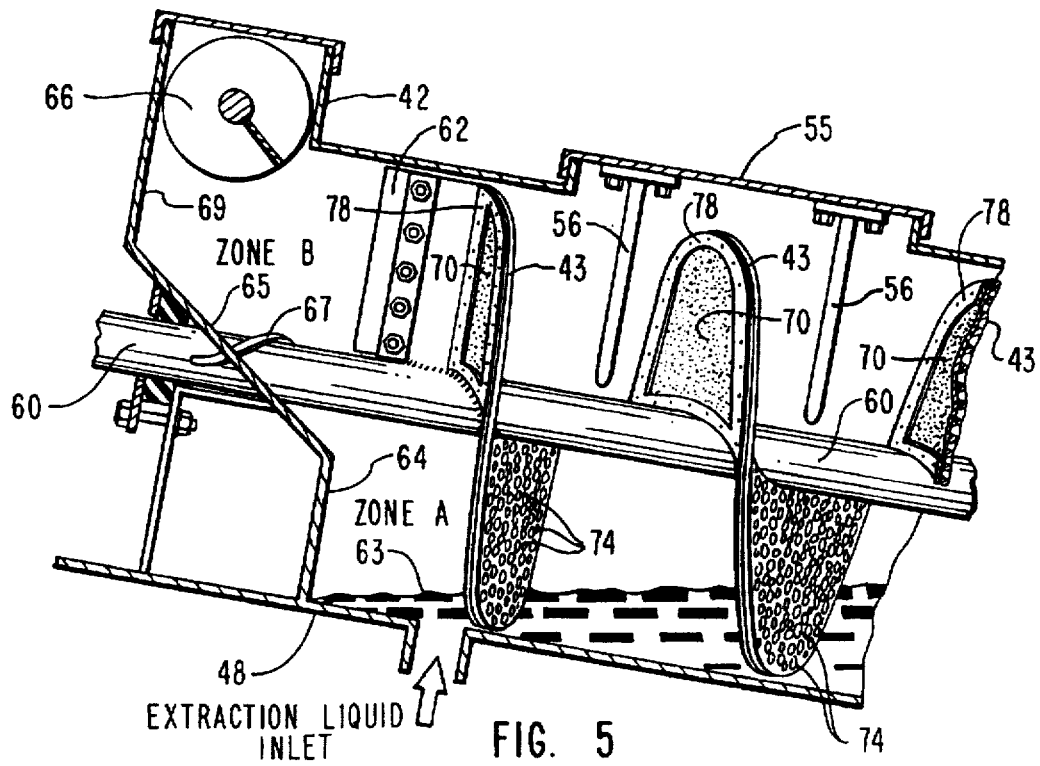
EXTRACTION LIQUID INLET FIG. 5

PROCESS FOR EXTRACTING WITH LIQUIDS SOLUBLE SUBSTANCES FROM SUBDIVIDED SOLIDS

This application is a continuation of application Ser. No. 08/443,579, filed May 17, 1995, abandoned; which is a continuation-in-part application of application Ser. No. 08/289,923, filed Aug. 12, 1994, issued Oct. 10, 1995, as U.S. Pat. No. 5,456,893; which is a continuation-in-part application of application Ser. No. 08/106,077, filed Aug. 13, 1993, abandoned.

FIELD OF THE INVENTION

This invention is directed to a process for extracting with liquids soluble substances from subdivided solid materials, and, in particular, for controlling small particles and fines during extraction.

BACKGROUND OF THE INVENTION

Processes which employ countercurrent liquid-solids extraction systems to convey the subdivided solids to be extracted in one direction through a tank, and flow the liquid, usually water, in the opposite direction through the subdivided solids are well known. During the contact of the liquid and solids as they move in opposite directions, soluble substances are extracted from the solids, as by osmotic and lixiviation transfer, and are removed with the enriched extraction liquid.

Apparatus employed for performing countercurrent extraction are of several different configurations. They may be in the form of a Robert battery, a set of identical cells which are filled and emptied alternatively in rotation. They may be in the form of slope diffusers as illustrated by U.S. Pat. Nos. 2,885,311 to Bruniche-Olsen et al. and 3,573,892 to Silver; vertical tower diffusers, as illustrated by a U.S. Pat. No. 3,142,589 to Schaffer et al.; and horizontal diffusers, for example, the R.T. diffuser.

In the case of vertical and horizontal diffusers, the diffusers are preceded by a hydrator that prepares the animal or plant materials for extraction by treating with hot water. The hot water "kills" the cells, so that cell membranes permit osmotic transfer of soluble substances through the cell walls by the extraction liquid.

The hydrators and continuous diffusers use screens at various locations for controlling the subdivided solids. The screens may convey or push the solids through the diffuser while allowing the liquid to pass therethrough. Because of the hydraulic pressures exerted against the screens, especially when they have a mat or matrix of solids, and particularly because of their need to convey solids, as in the case of horizontal and slope diffusers, the screens must maintain structural integrity during use, and for that reason have been made of plates.

In the past, small particles and fines contained in the larger subdivided solids were a problem. Ordinarily, the smallest openings that have been drilled or cast in such plates are ⅛ inch in diameter, a size sufficiently large to pass the small particles and fines. For example, screens for separating the liquid from solids in such apparatus are ordinarily plates that are about ⅛ to ¼ inch thick ordinarily containing drilled or punched holes about 9/32 inch across, a size that easily passes small particles and fines so that the screens cannot effectively control small particles and fines. Likewise, the scroll flights for conveying solids from one end to the other in vertical, horizontal, or slope diffusers are made of plates about ¼ to ½ inch thick which may contain holes about ¼ inch to ½ inch across; again, holes of such size will easily pass small particles and fines so that the latter cannot be effectively controlled. In the tower diffuser, scroll flights generally have no holes at all but just narrow sections of scroll flights. Scroll flights with or without holes, heretofore,. have been ineffective in controlling large amounts of small particles and fines.

The holes or slots in the separation screen have had to be large enough not to plug with subdivided solids. Therefore the depth of the holes has had to be somewhat less than the diameter of the holes or width of the slots, so that particles nearly the same diameter or width would not be caught in the hole or slot, thereby blocking the flow of extracting liquid through the separation screen. Furthermore, as in the case of continuous diffusers extracting sugar from sliced sugar beets called cossettes, the holes had to be larger than the cross sectional area of the cossette so that a cossette starting through the hole lengthwise would not "hang up" in the hole thereby blocking that hole to the passage of extracting liquid. Therefore holes in the diffuser separation screens were customarily larger than ¼ of an inch in diameter. Slots sometimes were made narrower than ¼ of an inch but were often subject to plugging as a cossette would lie along the length of the slot and block the passage of extracting liquid.

Continuous diffusers in the past, operating on extracting sucrose from sugar beets, have used screen wipers only on the separation screen between the juice compartment and the active extraction sections of the continuous diffusers: slope, horizontal, and tower (batch diffusers historically have had no separation screens). Screen wipers have been made of brass or micarta materials with a pointed edge designed to cut off and lift up cossettes that have partially entered the holes of the screen (9/32s of an inch or larger) or slots of the screen (⅛ of an inch or larger). Given the propensity for foreign materials to catch in these holes, the clean-cutting pointed edge of the screen wipers has been often chipped off, worn off, or rounded so that cossettes have been mashed into the holes, causing further blockage to the extracting liquid.

Therefore, in the past, continuous diffusers, and even batch diffusers, have been ineffective for processing materials containing small particles and fines. In particular, the scroll conveyors in vertical and slope diffusers have been largely ineffective in pushing the small particles and fines countercurrent to the water in the countercurrent system. The ineffectiveness in controlling small particles and fines has been off-set, in part, by the formation in some cases of a mat or matrix of fibers and large particles that capture the small particles and fines, so that, to some extent, even though the small particles and fines can pass through the holes of the separation screens and scroll flights, nevertheless they can be captured and conveyed to some degree, provided the fines are not present in too great an amount. For this reason, the preparation of materials to be extracted has attempted to keep the small particles and fines to a minimum, for example, usually to less than about 5% by weight, and desirably to less than about 3% by weight, of the solids to be treated.

The inability to prevent small particles and fines from being carried with the extracting liquid has limited the use of batch and continuous diffusers. Although batch and continuous diffusers have found wide usage for extraction in the beet sugar and cane sugar industries, the application of extraction to many other materials has been limited, because such other materials produce large amounts of small particles and fines that conventional batch and continuous diffusers do not adequately control. Since many solid substances, when subdivided, create large amounts of small particles and fines that cannot be controlled by conventional hydrators and diffusers, the application of batch or continuous diffusers to products outside of the sugar beet and sugar cane industries has been limited. For example, in preparing madder root for extraction by pulverizing, in one case, about 10% by weight of the pulverized root was small particles and fines. Many other products, when subdivided, produce small particles, fines, and powder that cannot be handled by conventional diffusers.

OBJECTIVES OF THE INVENTION

Accordingly, it is an object of the present invention to provide a process for controlling small particles and fines in hydrators and extractors, and, in particular, to provide a process in which the efficiencies of extraction or hydration are increased.

It is a further object of the invention to improve the efficiencies of hydration and extraction by the improved control of small particles and fines.

It is another object of the invention to provide process for hydrating and/or extracting plant and animal materials which have not been practicable to hydrate and/or extract heretofore in continuous diffusers or batch extractors.

Other objectives and benefits of the invention will be apparent from the following description and the accompanying drawings.

BRIEF DESCRIPTION OF THE DRAWINGS

FIG. 1C is a diagrammatic view illustrating a system employing the invention in a single-cell batch extractor with screen on one end only.

FIG. 1F is a diagrammatic view illustrating a system employing the invention in an adjustable incline cylindrical diffuser (hereinafter sometimes called the "ST Extractor").

FIG. 1G is a detailed diagrammatic view of the concentrated extraction liquid compartment from section GG of FIG. 1F.

FIG. 4 is a cross sectional view taken along line 4—4 of FIG. 3.

FIG. 5 is a sectional view taken along line 5—5 of FIG. 3.

DETAILED DESCRIPTION OF THE INVENTION

Figure 1A:
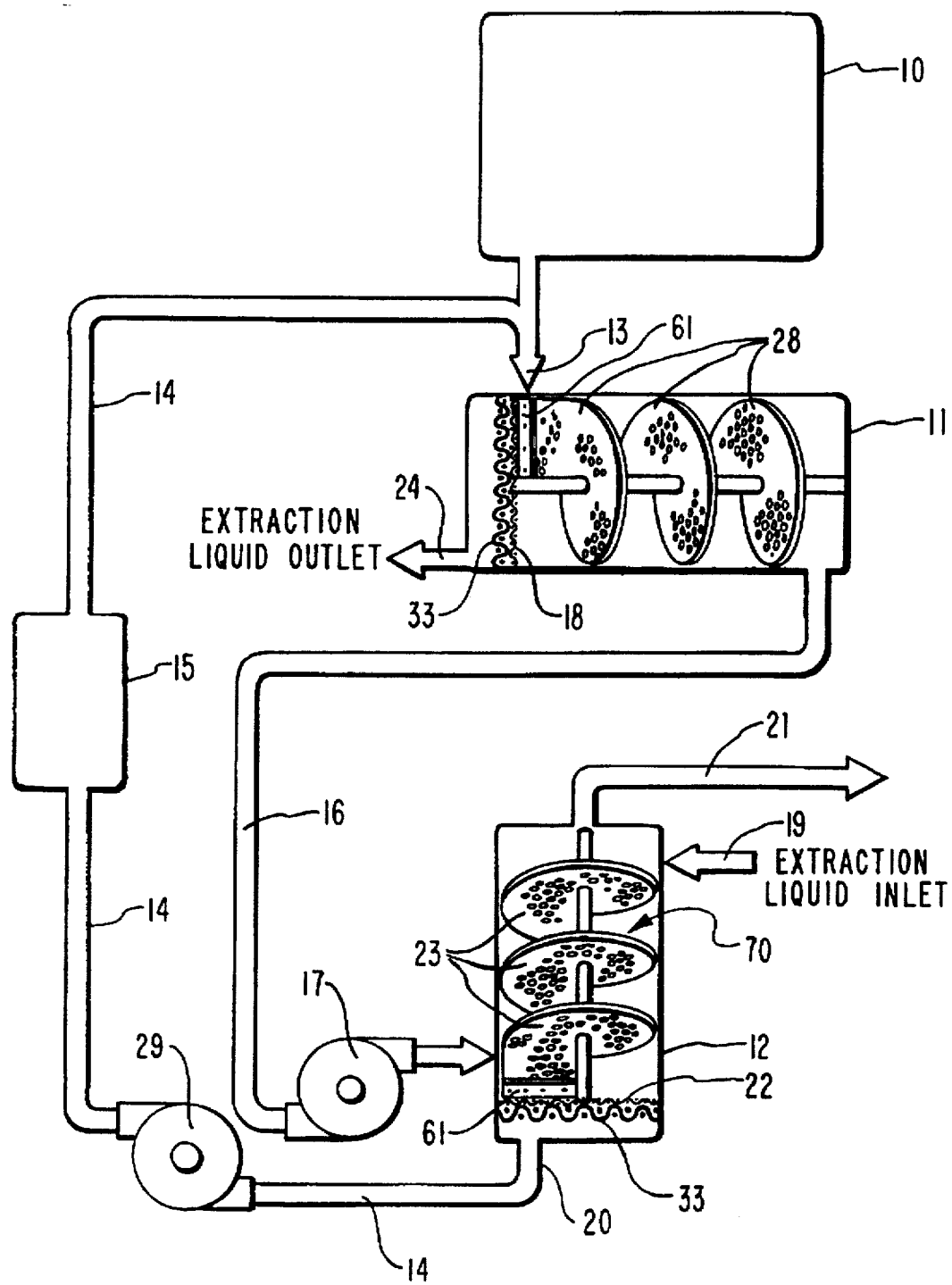
FIG. 1A is a diagrammatic view illustrating a system employing the invention in a vertical "tower" diffuser.

In accordance with the objects of the invention, it has been discovered that milli-screens suitably positioned can effectively control small particles and fines in extraction apparatus and processes. As indicated, the openings in conventional diffuser flights and screens are too large, and are not small enough, to achieve control, but it has been discovered that milli-screens suitably positioned can effectively control small particles and fines and thereby increase the efficiency of extraction and further permit extraction of materials which contain small particles and fines that have not been extracted heretofore.

Milli-screens used in the present invention have a plurality of discrete milli-openings of sizes less than about 0.095 inches across on the upstream side. The milli-inch sized milli-openings are made by any suitable process. According to a preferred method, the milli-openings are made by chemically etching holes in a thin metal plate, or sheet, for example, steel sheet having thickness anywhere in the range from about 0.001 to 0.095 inches, but usually from about 0.002 to 0.060 inches. The milli-screen openings may be of different configurations, including, for example, slots or circles. The milli-screen openings ordinarily constitute at least about 12%, and preferably at least about 20%, of the surface area of the milli-screen, so that the extraction liquids in the diffuser may readily pass therethrough. The milli-screens may be made from sheets that are flexible, or plates which can be bent so that they can be fitted, or shaped, where needed, for example, to the helical flights of a scroll conveyor. If the screens are flexible, they are desirably supported by thicker rigid plates, grids, or frameworks (not shown), for example, as by rigid plate screens 73 as described in connection with FIGS. 9 and 10. Of course, other techniques for fabricating the milli-screens can be employed within the spirit of the present invention.

Preparation of milli-screens of the type used in the present invention is disclosed, for example, in the following U.S. Pat. Nos. 3,329,541; 3,971,682 and 4,124,437.

As pointed out above, as a result of controlling the small particles and fines, the extraction efficiency is increased, and more efficient extraction is possible in connection with materials which contain large amounts of small particles and fines. Moreover, continuous extraction now can be performed on many materials that could not be continuously extracted heretofore, because, as a practical matter, the large amounts of small particles and fines could not be moved effectively in countercurrent fashion to the flow of extraction liquid. For example, in the preparation of many plant and animal products for extraction as by pulverizing, large amounts of small particles and fines are created which cannot be moved or conveyed by the conventional scroll conveyor screens in conventional continuous diffusers, or controlled in the diffusion process.

Small particles and fines refer to subdivided materials smaller than about 0.125 inch. Fines are usually regarded as particles that will pass a 5 U.S. Mesh screen. Small particles and fines also refer to particles having substances which can be extracted with a liquid extracting medium, and are to be distinguished from chaff, for example, a product which contains no extractable substances.

As previously indicated, diffusion and extraction with the invention can be performed with vertical "tower" diffusers, horizontal diffusers, slope diffusers, batch cells, or a series of batch cells. There is illustrated in FIG. 1A a diagram for extraction using the invention in a vertical "tower" diffuser. The invention will be described in connection with FIGS. 1A and 1B with the processing of sugar beets, but it will be recognized that other materials may be used. A beet slicer, or comminutor 10, is used to subdivide or slice the sugar beets into fiber bundles termed "cossettes." Heretofore, under conventional practice, the amount of fines generated during slicing was kept to a minimum, for example, to less than about 3% by weight of the cossettes. In the present invention, however, such a restriction on the amount of fines is not necessary; in fact, the extraction efficiency may be increased by using increased amounts of small particles and fines.

After slicing, the cossettes are introduced into a hydrator 11. In the hydrator, the cossettes are contacted with hot extraction liquid from the diffuser 12 through screen 22 through line 14 and through pump 29. Prior to being introduced into the hydrator 11 the liquid from the diffuser is heated in heater 15 to temperatures of 160° to 190° F. The hot extraction liquid introduced by line 14 into the hydrator "kills" the sugar beet cells in the cossettes and permits osmotic flow of sucrose from the sugar beet cells into the extracting liquid. The sugar beet cossettes are conveyed either by concurrent or countercurrent flow through the heating liquid for a short time, after which they are transferred by line 16 and pump 17 to the vertical "tower" diffuser 12. In order to move the cossettes in hydrator 11, flights 28 in a scroll conveyor push the solids from the inlet 13 to the outlet and line 16. The flights 28 preferably are provided with milli-screens, as described in connection with FIGS. 9 and 10 hereinafter. A milli-screen 18 and supporting grid 33 are also provided upstream of the extraction liquid outlet 24. A wiper(s) 61 may be installed to wipe clean the screen.

In the vertical tower diffuser 12, continuous extraction occurs between the cossettes and the extraction liquid during countercurrent flow of the cossettes and liquid. As illustrated in FIG. 1A the cossettes from the hydrator are transferred by a line 16 and pump 17 to a solids liquid feed into the diffuser 12. Extraction liquid is introduced at 19.

Figure 10:
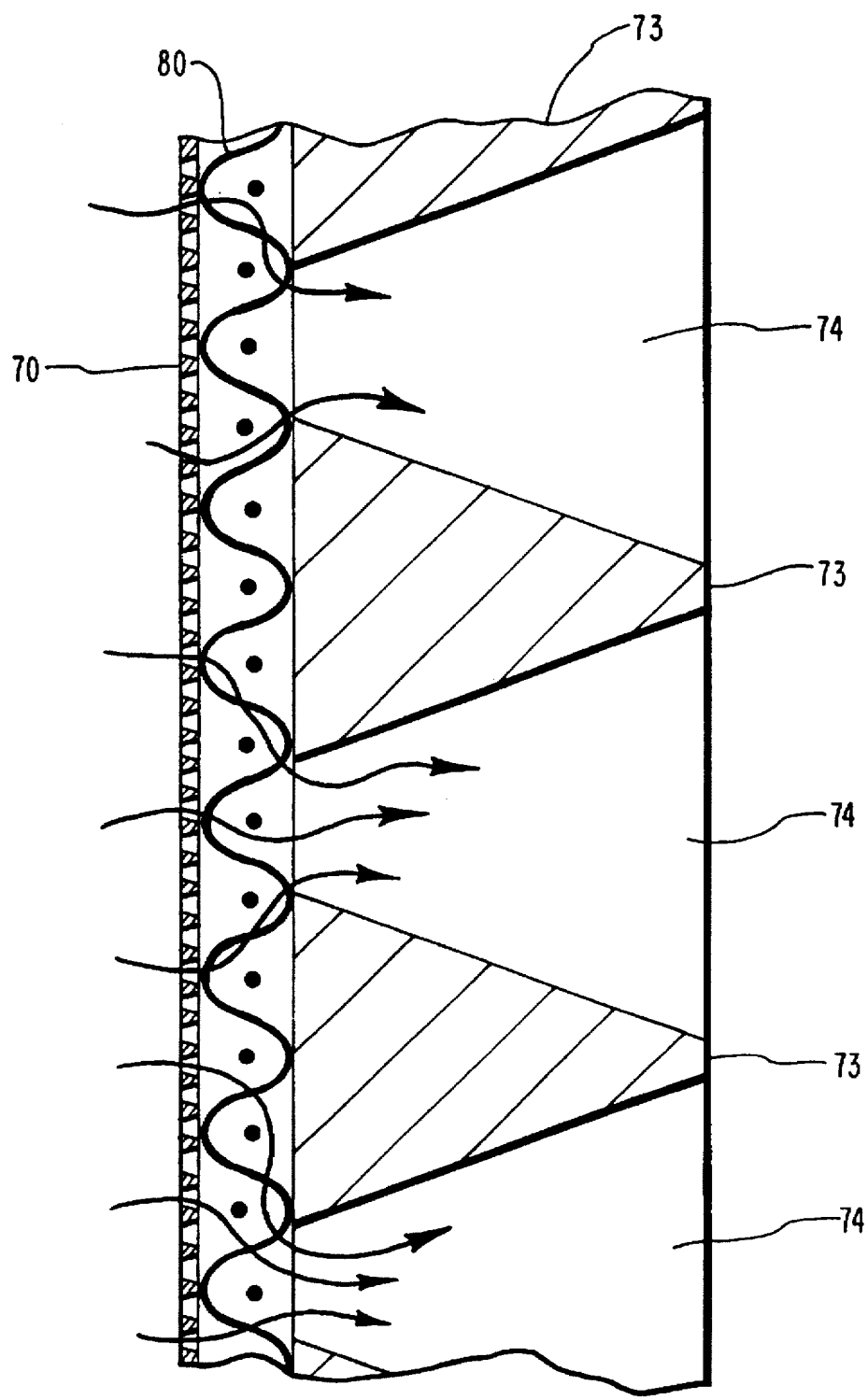
FIG. 10 is an enlarged fragmentary view illustrating a modified form of screen embodying the milli-screen of the present invention.

The cossettes are conveyed in the vertical diffuser by scroll flights 23. Because of the heavy pressure upon the flights required to push the cossettes up against the hydraulic head of liquid, the flights in the past have not been perforated in the standard tower diffuser. In addition, when perforated flights with larger holes have been tried, the cossettes have plugged in the holes and rotated with the flights instead of being pushed up the rotating ramp of the flight toward the discharge of the diffusers. In a vertical diffuser if heavy-duty supporting grids 23 are covered with milli-screens 70, the smoothness of the milli-screen surface helps convey the cossettes upward. FIG. 10 shows the configuration of the milli-screen allowing passage of liquid straight downward through the flights.

Figure 9:
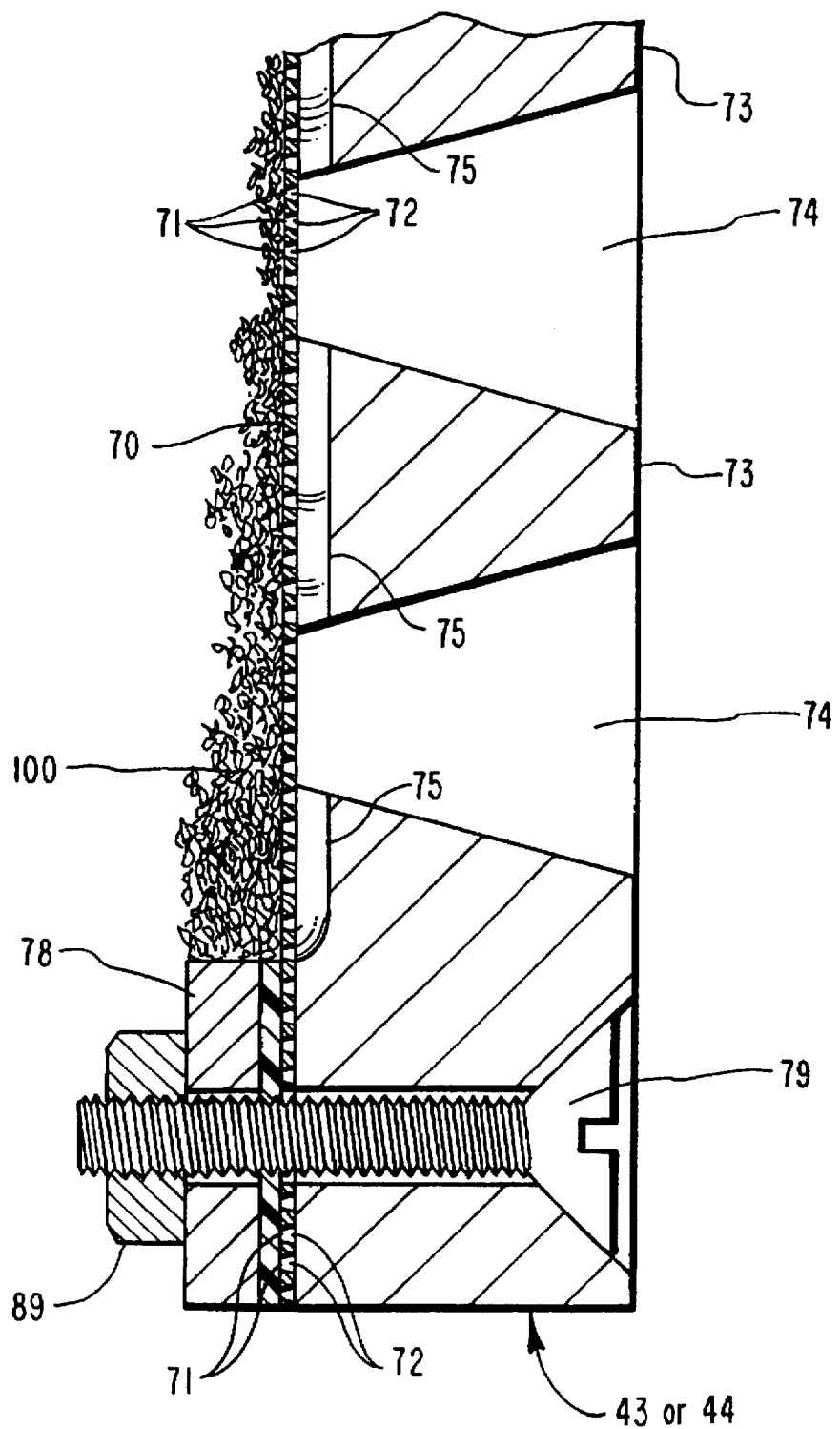
FIG. 9 is an enlarged fragmentary view illustrating a portion of a screen embodying the milli-screen of the present invention.

As shown in FIG. 9, which is a vertical rendering of what in the vertical diffuser becomes a near-horizontal position, the cossettes will pile against the surface of the milli-screen 70 and tend to block the passage of extraction liquid through the holes. However as the milli-screen rotates in the vertical diffuser along with its supporting grid 73, there is a shearing action between the surface of milli-screen 70 and the matrix of cossettes, which causes the cossettes to wipe the surface of the milli-screen and remove cossettes, fines, and small particles which have plugged the holes, all of which opens up ways for the extracting liquid to pass through the holes of the milli-screen. Thus the invention provides a more perfect countercurrent extraction in the vertical diffuser than was possible before, even with a standard material such as cossettes which usually have a minimum of fines and small particles.

A milli-screen, 22 and supporting grid 33 also are provided across the tank of the vertical diffuser ahead of the outlet 20 of the extraction liquid. Milli-screens may also be applied to separation screens on the sidewalls where present. With the milli-screen 22 utilized over a supporting grid as in the present invention, screen wipers much more effectively scrape off cossettes that are lodged against the face. The holes are small enough that the cossettes themselves cannot enter them. Even more important, foreign hard items such as gravel, welding rod, or wire now do not catch in the holes of the separator screen. This avoids damage both to separator screen and wiper. Therefore the milli-screen's wiper's sharp edge is much better maintained, and a clean lifting off of the cossettes and/or particles and fines is accomplished.

After extraction, the spent cossettes are removed at discharge 21, and the enriched extraction liquid at 20.

It should be noted that the scroll flights in the conveyors of the hydrator and diffuser can be sections with breaker bars 56 between the sections as shown in FIG. 5.

Figure 1B:
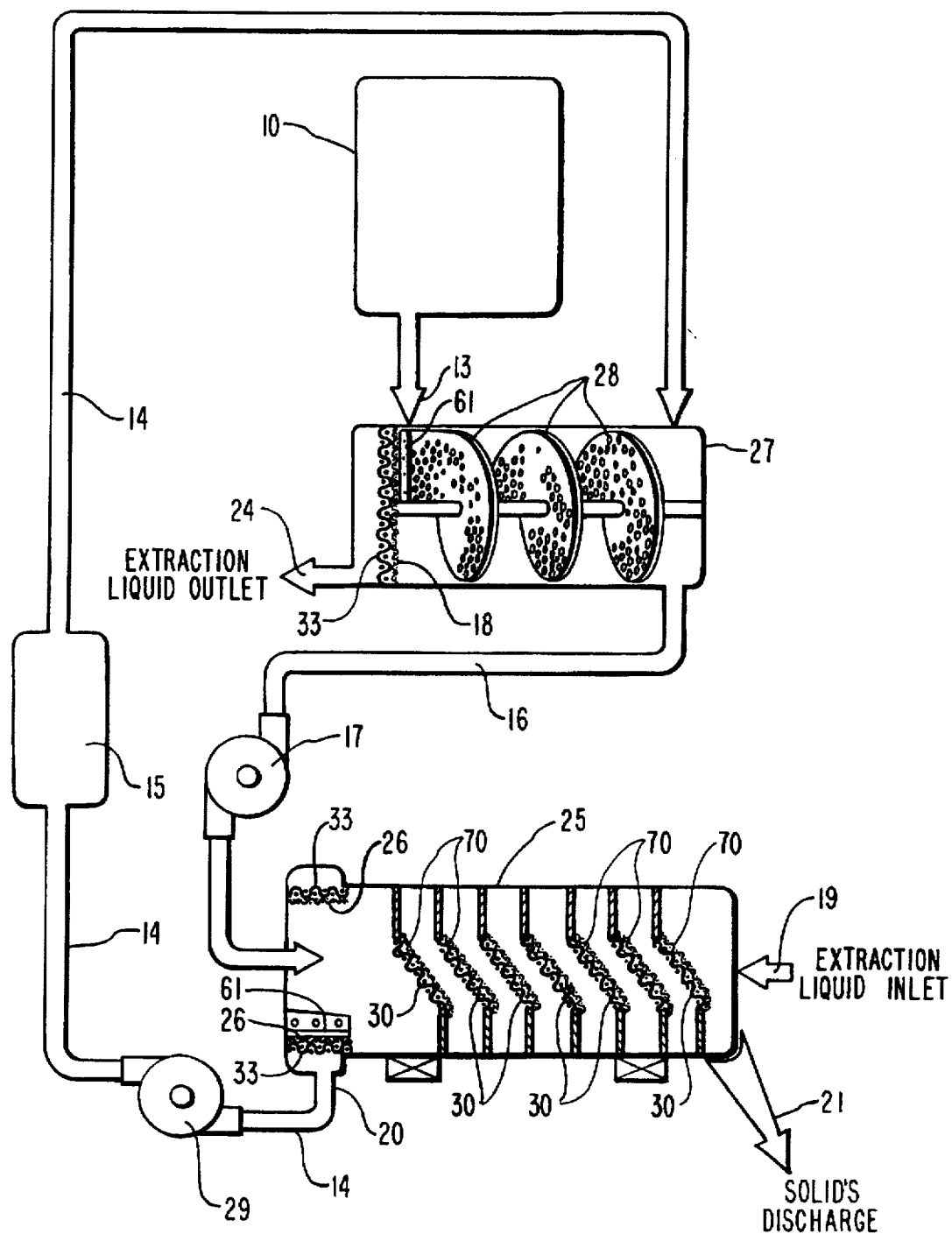
FIG. 1B is diagrammatic view illustrating a system employing the invention in a horizontal diffuser (also called an "R.T." diffuser).

The system for extraction employing the present invention also can be used with a horizontal diffuser as illustrated in FIG. 1B. The horizontal diffuser 25 receives the solids from the hydrator 27 through pump 17 and then conveys them to the solids discharge 21. Extraction liquid is introduced at 19 and withdrawn at 20, flowing countercurrent to the solids.

The horizontal diffuser is so arranged that the extraction liquid introduced at 19 at the end of the drum reaches the other end of the drum after a number of revolutions equal to half the number of compartments in the drum. The cossettes travel in a countercurrent direction but at half the rate of the extraction liquid. Screens 30 mounted in each compartment will lift the cossettes out of the extraction liquid as the diffuser drum rotates upward, and the cossettes will substantially drain of liquid. On the downward turn of the drum the cossettes will drop out of the screened compartment and slide over solid sloping plates into the next compartment. Milli-screens 70 may be provided to cover the screens 30 in each compartment. As the horizontal diffuser rotates and the screens 30 carry cossettes and extracting liquid upward, the cossettes slide along the milli-screen 70, wiping the milli-screen surfaces and allow passage of extraction liquid therethrough. It is especially important to have a milli-screen 26 with Supporting grid 33 and screen wiper(s) 61 mounted at the cossette feed end and upstream from the liquid outlet 20.

Figure 1D:
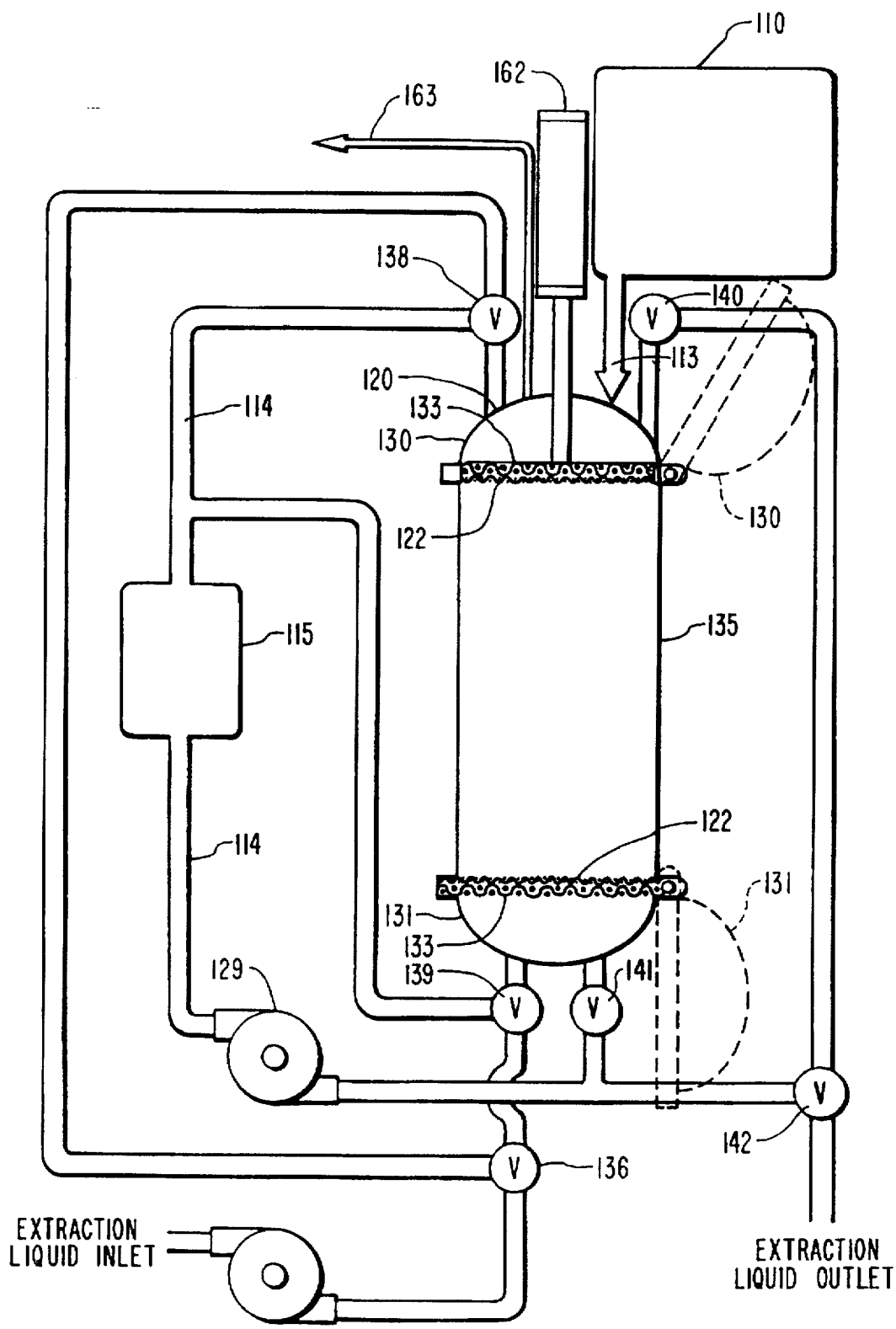
FIG. 1D is a diagrammatic view illustrating a system employing the invention in a single-cell batch extractor with screens on both ends.

There is illustrated diagrammatically in FIG. 1C a batch extraction device, using a single cell whose top 130 can be readily hinged out of the way for filling and whose lower main section 134 can be readily tipped up for emptying. There is illustrated in FIG. 1D a diagram for another batch extraction device, using a single cell whose top 130 can be readily hinged out of the way for filling and whose bottom 131 can also be readily hinged out of the way for emptying. The invention will be described in connection with FIGS. 1C and 1D with the extraction of dye from cochineal, but it will be recognized that other materials may be used. A cochineal cracker, or comminutor 110, is used to crack, subdivide, or slice each cochineal into three or four particles. The cochineal in prepared form are fed into tank 134 or tank 135 where the cochineal are charged through a chute 113 by opening the feed lid 130. This lid, along with the milli-screen 122, supporting grid 133, and screen wiper(s) 161 if installed, is hinged in a manner to allow unrestricted charging of the cochineal.

In tank 134 or 135 after the lid is closed, extraction liquid is pumped into the tank from the bottom, passes up through the cochineal and passes through milli-screen 122, supporting grid 133, and out port 120. The extraction liquid flows through line 114 to the extraction liquid outlet if the concentration is of sufficient strength. If it is not of sufficient strength and if the cochineal still retain much of the dye material, the three-way valve 136 directs the flow of the liquid through line 119, through valve 137, and pump 129 into heater 115 and back into cell 134. This will continue until the concentration of dye in the extraction liquid outlet nearly reaches the concentration of dye in the cochineal. Then valve 136 may direct the flow to the extraction liquid outlet. If the concentration of the extraction liquid is not of sufficient strength to be acceptable for dying purposes, this extraction liquid may be introduced to a fresh charge of cochineal and the process resumed.

Figure 13:
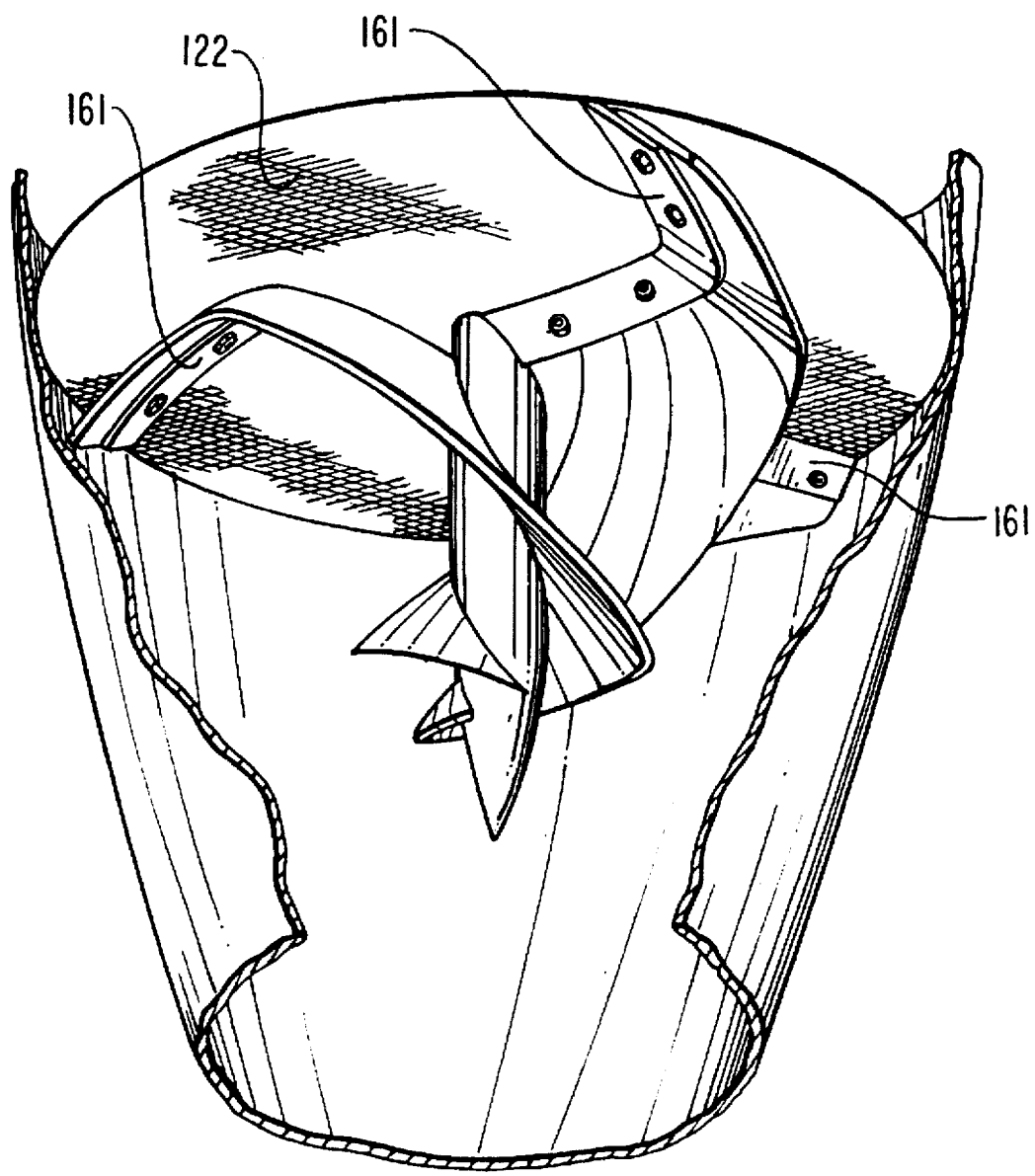
FIG. 13 is a perspective view of screen wipers for the batch or continuous extractors.

As shown in FIG. 13, motor or hydraulic driven screen wiper(s) 161, consisting of one, two, three, or more arms may be installed to wipe the fines off the face of the milli-screen and scroll the fines down away from the milli-screen and towards the center of the cochineal pack where larger cochineal particles will tend to arrest the small particles and fines of the cochineal and keep them from flowing with the extracting liquid back towards the milli-screen.

In drawing 1D with the batch cell 135 having milli-screens at both ends, if milli-screen 122 at the bottom plugs with fines, three-way valve 139 will open for flow from pump 129 and three-way valve 138 will close for flow from pump 129. Two-way valve 141 will close and two-way valve 140 will open. By these valving changes the flow of liquid within the cell will be reversed, and back flushing and hence cleaning of the screen can be accomplished. This direction of extraction liquid flow in 135 may be maintained until the upper screen becomes blinded by fines, and then the direction of flow may be reversed again. The temperature of the extracting liquid can be maintained by virtue of the liquid heat exchanger 115.

As shown in FIG. 13, small motor or hydraulic driven screen wiper(s) may also be utilized with FIG. 1D if desired to assist the milli-screen 122 to keep open to the flow of extracting liquid. If wipers are not installed, the upper milli-screen 122 and supporting grid 133 may be mounted on a hydraulic ram 162 which can be activated to compress the subdivided solids in tank 135 and accomplish dewatering of the subdivided solids. A vacuum line 163 may be connected to the top lid to evacuate liquid that is pressed through the upper milli-screen 122 and supporting grid 133. The hydraulic ram 162 may also be utilized to discharge the cochineal or other subdivided solids by being extended after the lower lid is opened. The milli-screen 122 mounted on the supporting grid 133 in conjunction with the hydraulic ram 162 makes an efficient dewatering possible especially of the small particles and fines.

Figure 1E:
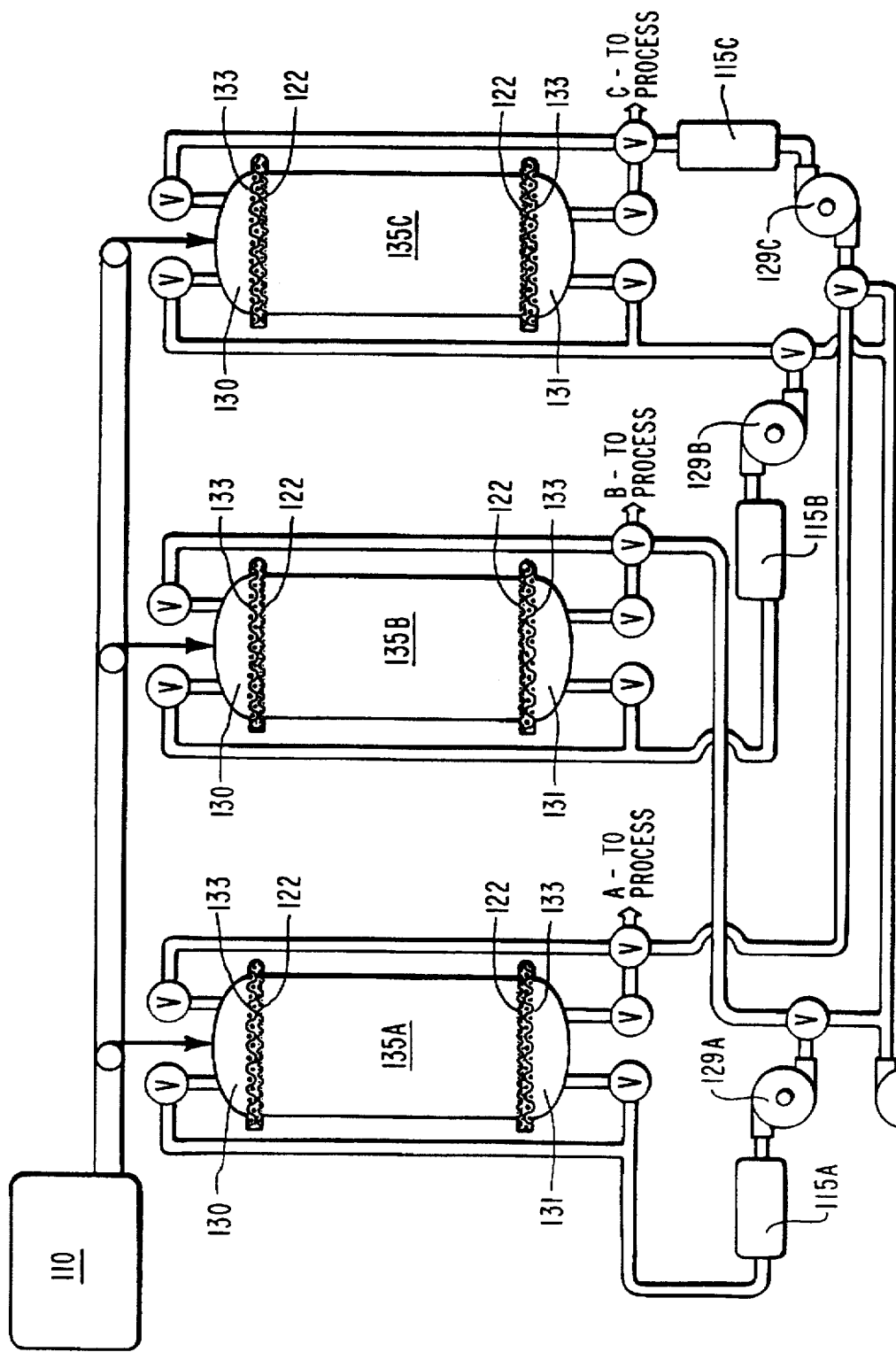
FIG. 1E is a diagrammatic view illustrating a system employing the invention in a series of cells composed of items from FIGS. 1C or 1D.

In FIG. 1E a series of three cells of the type 1D is shown and would be located in a circle or in parallel lines in number from two up to thirty or more cells. Operationally, the extraction liquid passes through the cochineal in each cell from one cell to the next successively in the direction of the cell most recently loaded with cochineal. In the circulation series, the cell most recently filled with cochineal and the one from which the final extraction liquid is drawn is considered to be the first or "head cell." The adjacent cell from which extracting liquid is withdrawn to feed the first cell is called the second cell. The third cell on this diagram, the one from which extracting liquid is drawn to feed the second cell, is called the "tail cell." This is the cell which receives the water or initial (lowest concentration of) extracting liquid. If there are more than three cells in the series, the last cell, being the first to receive the initial extracting liquid, is called the "tail cell."

For example, in FIG. 1E, cell 135A becomes the "head cell" after it is charged with cochineal from comminutor 110. Cell 135C is then the "tail cell" and receives the initial extraction liquid through pump 129C, which is pumped through a heat exchanger 115C and through the cochineal in cell 135C. The extracting liquid from cell 135C is pumped by pump 129B through heat exchanger 115B into cell 135B where the cochineal having been charged the turn before are stronger in dye concentration than those in cell 135C. The extraction liquid picks up additional dye in cell 135B and further depletes the dye content of the cochineal in cell 135B. Then the extraction liquid exiting from the outlet of 135B is picked up by pump 129A, pumped through heat exchanger 115A and enters cell 135A where it encounters the freshly-charged cochineal in cell 135A. The dye content in the extraction liquid increases as it passes through cell 135A. Valve "A-TO-PROCESS" is opened to pass the highest dye concentrate to be containerized or processed. As the dye content of the cochineal in cell 135C drops to a point low enough to not justify further recovery, flow of extraction liquid to the inlet of cell 135C is stopped, the depleted cochineal are drained or pressed of liquid, and then the cochineal are discharged from cell 135C by opening the hinged bottom 131. The hinged bottom is then closed, the hinged top 130 is simultaneously opened, and cochineal are fed to cell 135C from comminutor 110, and cell 135C becomes the "head cell." Cell 135A becomes the second cell, and cell 135B becomes the "tail cell." Thus each cell in succession begins as the "head cell," and moves in time to being the "tail cell." This establishes a pattern by moving the extraction liquid inlet from the cell with the lowest cochineal dye content successively to the next cell in ascending order of the alphabet while the extraction liquid is sent to process or containerization after passing through the cell most recently charged with cochineal in descending order of the alphabet.

The milli-screen 122 used in FIGS. 1C, 1D, and 1E supported by thicker plate screen 133 makes possible the full retention of the solid materials within the cells themselves and prevents or greatly reduces a concurrent flow of small particles with the liquid, thus establishing a full countercurrent extraction. If the milli-screen becomes blinded, back flushing is possible by reversing the flow of the extraction liquid through the cells. Also, screen wipers such as shown in FIG. 13 may be installed to wipe away small particles which may block the holes of the milli-screen 122.

Figure 1H:
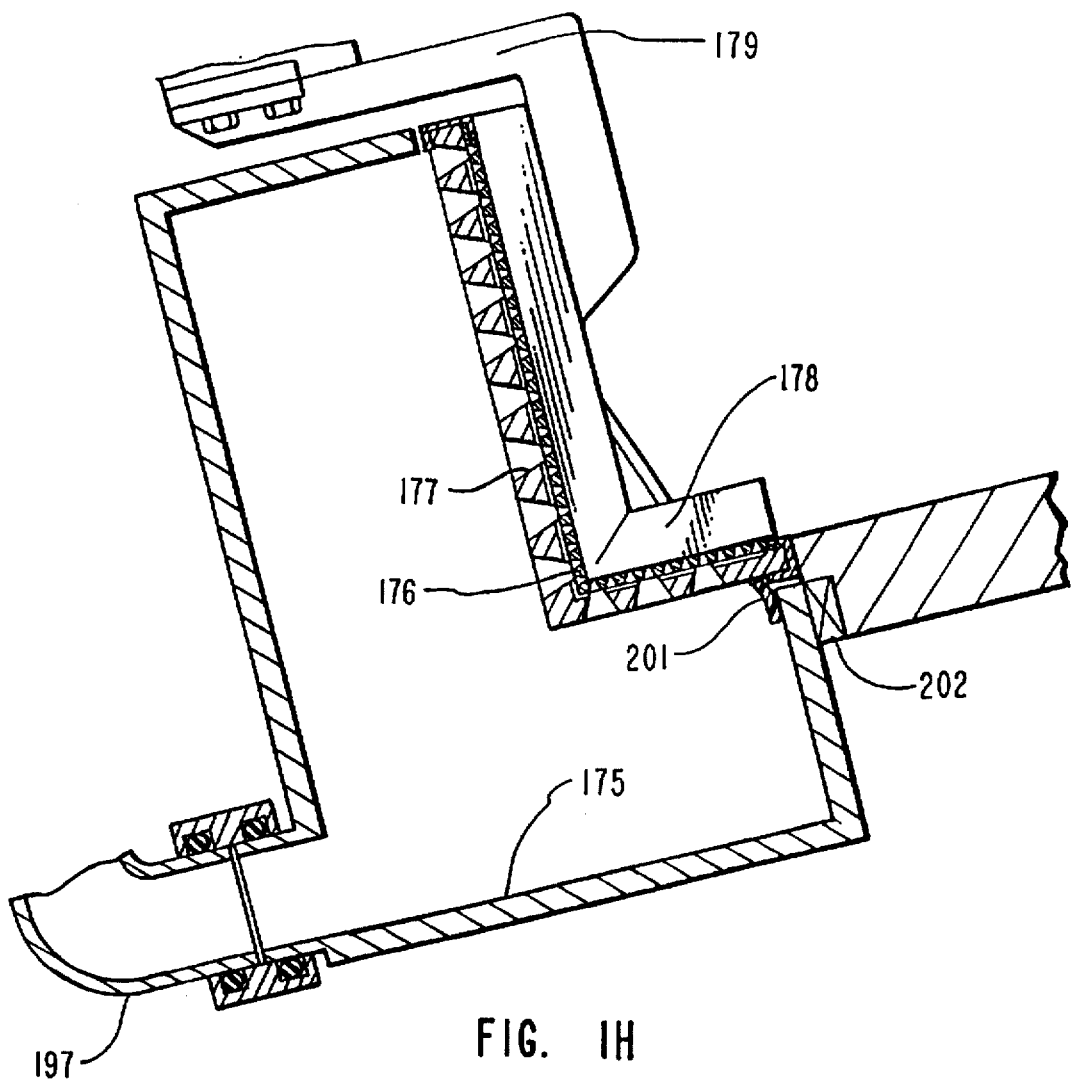
FIG. 1H is a detailed diagrammatic view of an alternative liquid compartment from that shown in FIG. 1G.

The extraction apparatus as shown in FIGS. 1F, 1G and 1H represents another extraction unit, the ST Extractor, that is unique in its ability to handle many small subdivided particles, such as subdivided tea leaves, ground coffee, and cochineal. It can also handle the extraction of soluble solids from mixed particles varying in size from large down to small.

This ST Extractor 180 consists of a rotating cylinder 181 with milli-screens 183 attached perpendicularly to the inner walls of the cylinder 181. This firm attachment allows no bypassing of either liquid or subdivided solids between the inner cylinder wall and the milli-screens. The milli-screens are formed into the shape of a helix. It may be necessary to support the milli-screens with radial supports (not shown) and/or with a helix-shaped bar (also not shown) on the inside edge of the milli-screens to give structural rigidity to the milli-screens in the interior of the cylinder.

The ST Extractor will rotate on trunion rollers 185 located near the upper and lower ends. Motor 186 drives the rotation of the ST Extractor 180 through a reducer and drive sprocket (or gear) 187 and chain drive (or gear ring) 188.

The ST Extractor 180 is adjusted in its inclination by a height adjustment support 189 at the upper end and rotates about a base pivot 200.

As the extraction liquid is added at 193 and enters the upper end of the ST Extractor, it flows by gravity through the milli-screens successively downhill until it reaches the concentrated extraction liquid compartment 175 through milli-screen 176 as best shown in FIG. 1G.

A comminuter 169 transforms the solids into a subdivided state from which a maximum amount of soluble solids can be extracted but not subdivided to the extent that the resulting particles will pass through the milli-screens of the extractor. These subdivided solids from which the soluble solids are to be extracted are introduced into the hydrator 170. An agitator 171 may be used to mix the subdivided solids with recycled liquid which is pumped in through pipe 198. The resulting slurry of subdivided solids and concentrated recycled extraction liquid is pumped into the ST Extractor through pump 172.

The rotating cylinder 181 combined with the milli-screens (formed in a helix) push the subdivided solids upstream as the extracting liquid flows downstream through the subdivided solids and then through the milli-screen openings. The subdivided solids tend to remain in a slurry in the lower portion of the cylinder.

The rotating helix milli-screen scrolls the solids to the discharge end, where the solids fall into a discharge hopper 190. A drip skirt 194 prevents any liquid from adhering to the outside cylinder wall and dripping down outside of the discharge hopper.

Since increasing temperatures of the subdivided solids and the extracting liquids tends to increase the overall extraction efficiency, steam jackets 195 on the exterior are provided to heat the interior of the ST Extractor. Steam is introduced through a concentric pipe 192, through a rotary joint 191, into the steam jackets either in parallel or in series as is desired for the operation. In the last steam jacket, located at the end where the solids are introduced, condensate traps 196 and non-condensable vents 196 are installed around the circumference of the annular steam jacket. A drip trough would be installed under the undercarriage of the ST Extractor 180 to catch the condensate.

Further in the pipeline 198 entering the hydrator, a tube and shell heater 199 or plate heater may be added to increase the temperature of the recycled liquid which will also increase the temperature of the subdivided solids.

The concentrated extraction liquid compartment 175 on the downstream side of milli-screens 176 can be integral to the cylinder (see FIG. 1G) or can be a separate non-rotating compartment (see FIG. 1H). The concentrated extraction liquid at the lower end of the ST Extractor flows through milli-screen 176, which is supported by a backup gridwork 177. Wiper blades 178 are spaced as closely together as desired to keep the screen openings clear. The wiper blades are supported by brackets 179 which are attached to non-rotating structure.

Referring to FIGS. 1G and 1H, the concentrated extraction liquid compartment 175 will have liquid removed from it through an adjustable swivel pipe 197, or some other suitable level control. If the concentrated extraction liquid compartment is integral, as shown in FIG. 1G, a number of adjustable level control swivel pipes 197 will be located around the circumference of the discharge end and be adjustable when the ST Extractor is stopped to provide the desired liquid level.

For applications where units are large or where there is a desirability to control liquid level at varying levels during operation, a design of the separate non-rotating concentrated extraction liquid compartment may be provided with appropriate seals as shown in FIG. 1H. To prevent liquid from leaking between the rotating cylinder 181 and the stationary concentrated extraction liquid compartment 175, a lip seal 201 along with a labyrinth or other liquid seal 202 would be provided.

The invention will now be described in connection with a slope diffuser depicted in FIGS. 2–12, 14–16.

Figure 2:
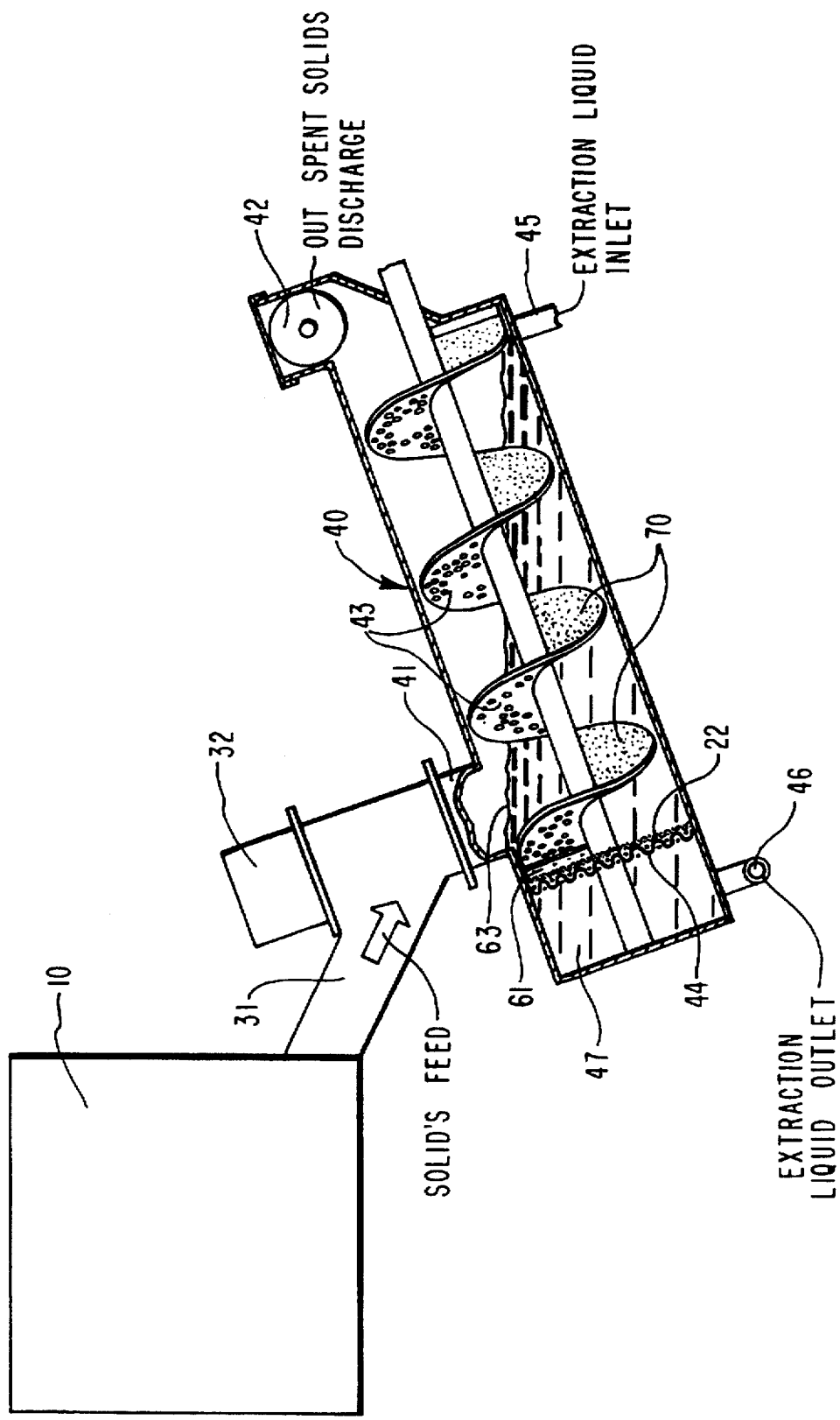
FIG. 2 is a diagrammatic view of a system employing the invention in a slope diffuser.

Referring to FIG. 2, the solids to be extracted are first prepared in a comminutor 10. The comminutor may be a pulverizer, shredder, slicer, mill, and the like, for subdividing the solids to be treated. The subdivided particles are transferred to the slope diffuser 40 by an appropriate conveyor system 31 controlled by a regulator 32 which determines the rate of feed.

It will be noted that a separate hydrator 11 of the type illustrated in FIGS. 1A and 1B is not shown in FIG. 2. The reason is that hydration can take place in the first section of the slope diffuser as will be described in connection with FIGS. 11 and 12.

The subdivided particles are introduced into the slope diffuser 40 at the solids feed inlet 41 and removed at the solids discharge 42. The solids are conveyed from the feed end 41 to the discharge end 42 by the action of suitable helical or scroll flights 43.

Extracting liquid is introduced through inlet 45 and withdrawn at outlet 46 so that the liquid flows through the slope diffuser by gravity from the inlet to the outlet in flow countercurrent to the movement of the solids from the feed end 41 to the discharge end 42. In order to permit the flow of fluid the flights 43 are provided with holes or openings the upstream sides of which my be provided with a milli-screen.

At the lower end of the slope diffuser there is a separator screen 44 between the extraction area represented by the conveyor flights 43, and the liquid discharge compartment 47. The screen 44 is positioned upstream from the liquid outlet 46. The purpose of the screen 44 is to separate from the extracting liquid large sized solids that have passed around or through the flights before the extraction liquid is withdrawn at outlet 46.

Figure 3:
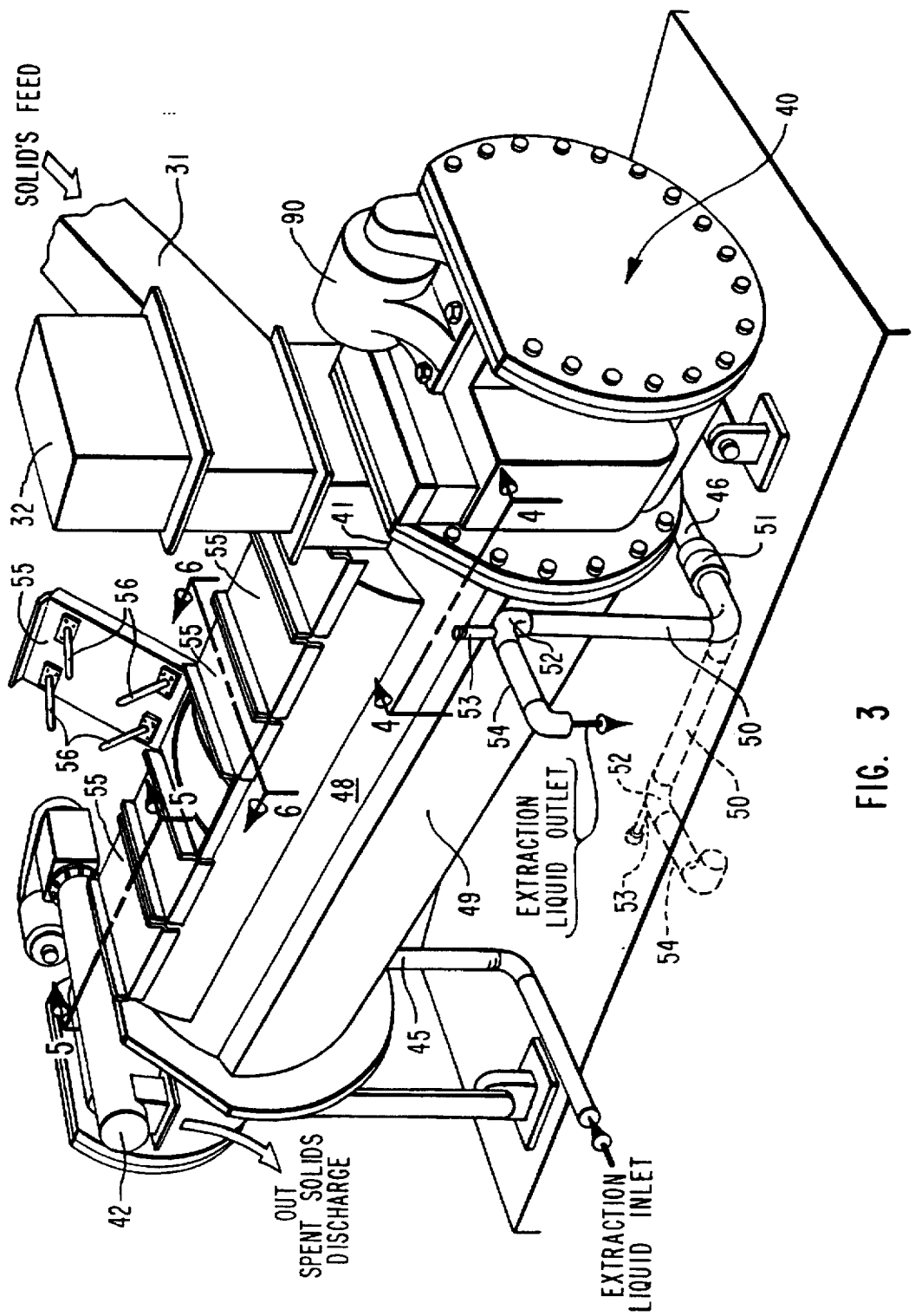
FIG. 3 is a perspective view of a specific embodiment of a slope diffuser which may be used in carrying out the invention.

Referring now to FIG. 3, there will now be described in detail a slope diffuser 40 embodying the invention. The subdivided solids are introduced through the solids feed conveyor 31 at a rate controlled by regulator 32. Solids are conveyed by flights 43 (FIG. 2) from the solids feed inlet 41 to the discharge 42. The extraction liquid is introduced at 45 through an inlet to the upper end portion of the slope diffuser, flows through separator screen 44 and is withdrawn at 46 at the lower end of the slope diffuser, so that the liquid runs by gravity from the inlet to the outlet countercurrent to the subdivided solids.

In accordance with the present invention, referring to FIG. 4, the screen 44 is provided on the upstream side with a milli-screen 22. Milli-screen 22 provides a positive separation of the subdivided solids, particles, and fines from the extraction liquid stream. This milli-screen separation transforms the "liquid discharge compartment" into the "screened liquid discharge compartment." This compartment contains liquid that can be used for back-flushing milli-screen 22. The back-flushing will float off the front surface of milli-screen 22 any overlaying materials that may be adhering to the upstream surface of the screen. Also, screen wipers 61 are installed to clean the upstream surface of the screen.

Due to the ability to control the discharge rate at 46 and to keep screen 44 free from plugging by locating screen 22 on its upstream face, the level of liquid 63 (see FIG. 5) in the diffuser is easily maintained.

The screened liquid discharge compartment 47 should be as high as the diameter of the sweep of the screen wipers, and as wide as the outermost stretch of the wiper arms, both to give maximum screening efficiency. The depth of the screened liquid discharge compartment should be sufficient to reach in a hand to clean the backside of screen 44 if necessary or for a man to climb in for cleaning, installation, or disassembly of the screen configuration.

Because the milli-screen is relatively free from plugging, the screened liquid discharge compartment 47 provides a positive way to maintain a steady level of liquid in the major extraction area of the diffuser.

The liquid outlet 46 may be provided with a level control pipe 50 as shown in FIG. 3 which as it swivels controls the level of the liquid within the slope diffuser. As illustrated in FIG. 3, the outlet pipe has a pivot 51 which is connected to a pipe 50 that is tipped toward the vertical in one position to determine the level of liquid in the diffuser 40, and which can be pivoted about pivot 51 to the dotted line position at the conclusion of the diffusion operation for draining the diffuser 40 of all of the liquid. When in operating position, the discharge elbow 52 should have a short, small-diameter, vertical pipe 53 positioned above it which serves as a vacuum breaker and does not allow the downpipe from 54 to serve as a siphon in draining the screened liquid discharge compartment. Thus an automatic level in the juice compartment can be maintained by positioning the level of the discharge pipe 54. An automatic level control valve may also be used.

The top of the diffuser 40 is provided with a number of covers 55 which are pivoted or hinged to allow access to the conveyor and conveyor flights internal to the diffuser. Some of the covers may have breaker bars 56. The breaker bars project into the liquid to stop in-place rotation of the solids with the scrolls. Hence the solids are conveyed forward.

Breaker bars may be added projecting from the bottom of the tank, the side, or the access covers as shown in FIG. 3. The screw flights are interrupted and spaced apart at the location of these breaker bars to provide clearance between screw flights and breaker bars.

Figure 6:
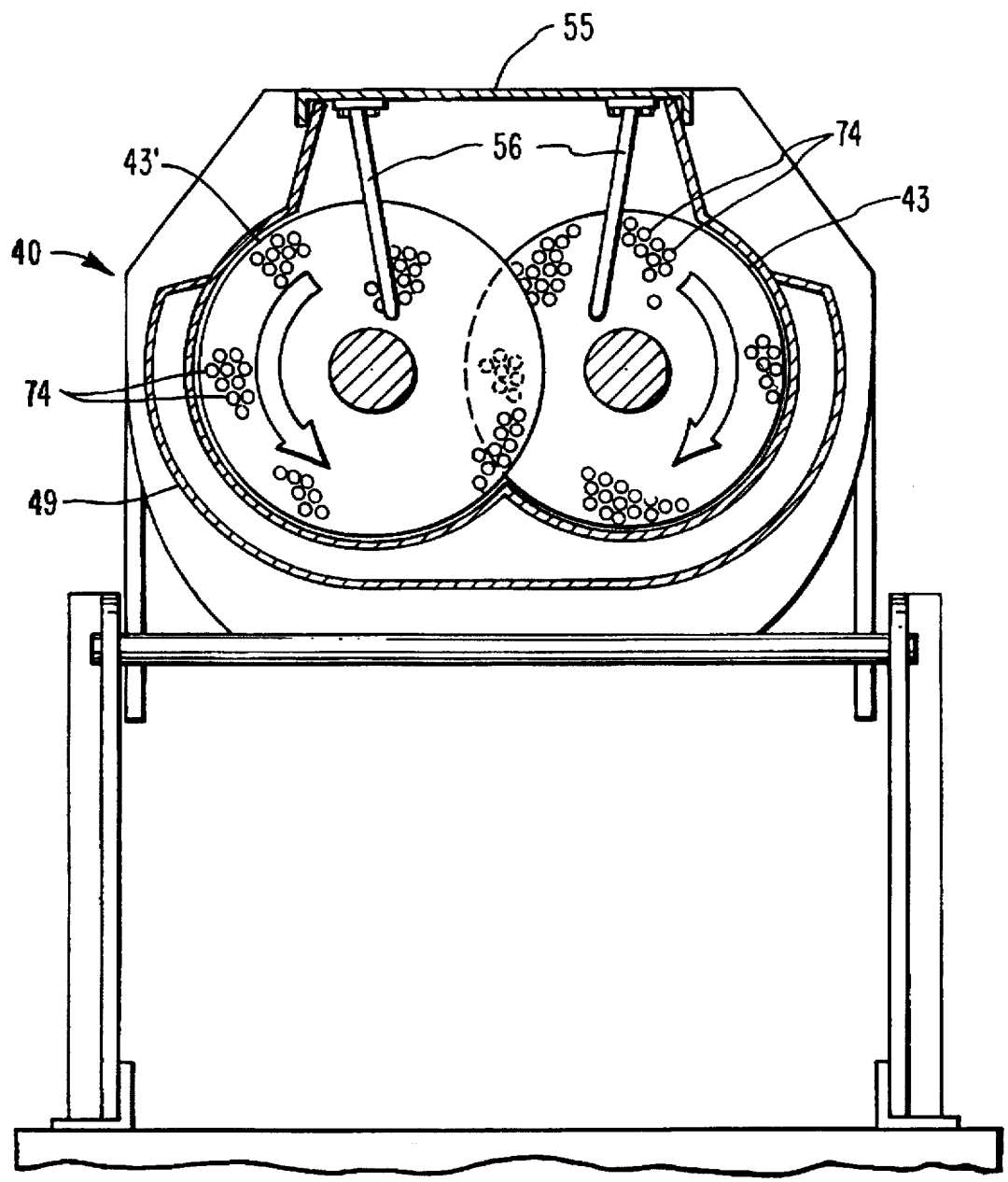
FIG. 6 is a sectional view taken along line 6—6 of FIG. 3.

It will be noted that the slope diffuser has a tank 48 for containing the liquid and the subdivided solids during the extraction process. In the particular slope diffuser of FIG. 3, two scroll conveyors are used for pushing or moving the subdivided solids from the feed end to the discharge outlet, as best seen in FIG. 6. However, a single scroll conveyor may be employed if desired. As shown in FIG. 6, twin scrolls 43 and 43' rotate in opposite directions for pushing the solids to the discharge outlets 42. The downstream sides of the scrolls are shown with openings 74 for passage of extraction liquid therethrough. The upstream sides (not shown in FIG. 6) are provided with milli-screens.

Referring to FIG. 4, there is illustrated scroll flight sections 43 mounted on a rotating shaft 60 which is driven by motor 90 (see FIG. 3).

As illustrated, the scroll flights are in the form of rotating screens which permit the flow of liquid through the subdivided solids and the flights. According to the present invention, the upstream side of each scroll flight is provided with a milli-screen 70 as shown in FIG. 4, and as described in connection with FIGS. 9 and 10 hereinafter. Also, a milli-screen 22 is used as a separator screen at the lower end of the slope diffuser as depicted at 44 in FIG. 4. The separator screen extends across the tank 48 and separates the solids from the extraction liquid before the extraction liquid is removed at outlet 46.

In order to prevent the accumulation of solids on the upstream face of the milli-screen 22 a wiper(s) 61 is used to clean this upstream face of the screen. The wiper 61 is attached to the leading edge of the first scroll flight 43 in front of the milli-screen 22 and rotates with the shaft 60. Auxiliary wipers may also be added.

Figure 14:
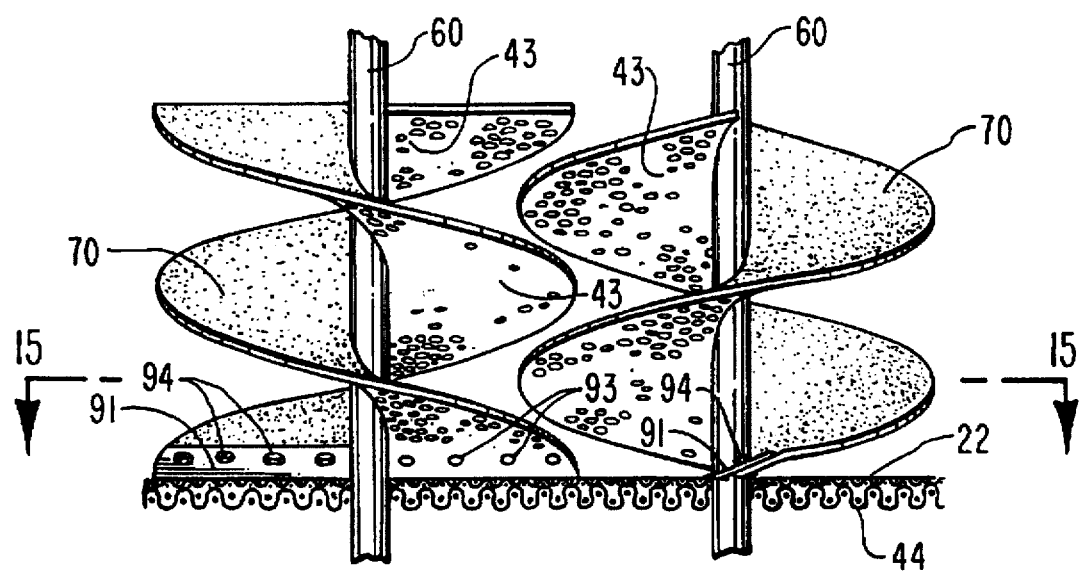
FIG. 14 is a plan view of the parallel scrolls in the slope diffuser showing the double screen wipers and double helix configurations.
Figure 15:
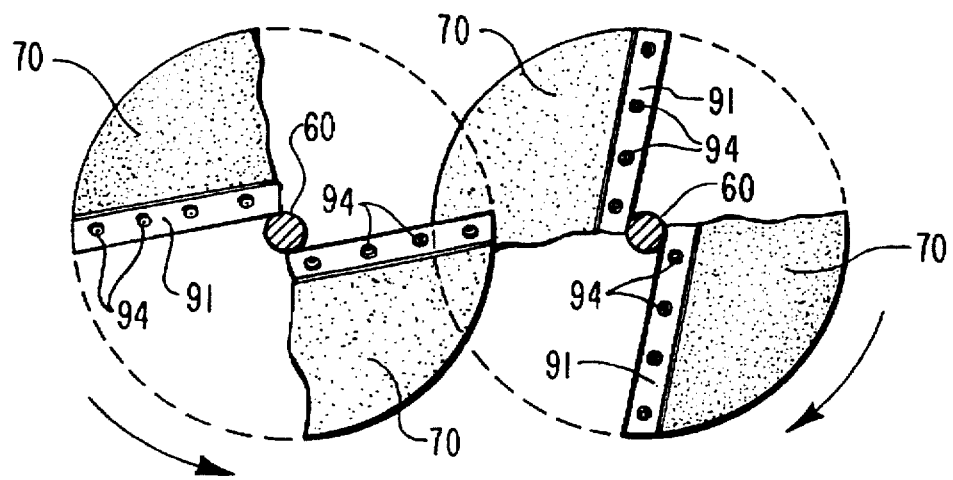
FIG. 15 is a cross-sectional view of FIG. 14 taken along line 15—15 showing angled screen wiper configuration.

As shown in FIG. 14, when there are numerous small particles and fines, double screen wipers 91 may be mounted on each shaft 60 of the slope diffuser. In addition to having two wipers on each scroll shaft, a helix will project up the shaft from each wiper so that up to the feed section the shaft will have a double helix. This will aid the diffuser in handling numerous small particles and fines and move them away from the separator screen area and mix them again with larger particles that are being scrolled up the diffuser. FIG. 15, a cross sectional view of FIG. 14, illustrates that the screen wipers 91, in this case, should be angled from the shaft not in a radial direction but at a forward angle to the radius so that the small particles and fines may be swept from the outside of the cleaned circle towards the inner radius to be scrolled away from the screen.

Figure 16:
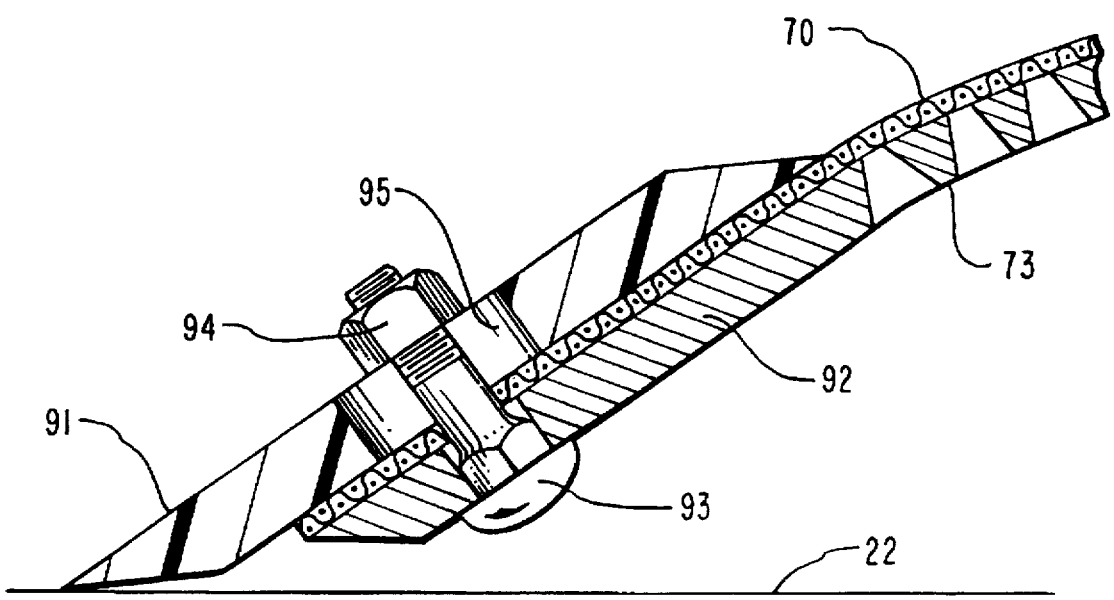
FIG. 16 is a detailed view of a typical screen wiper.

FIG. 16 shows a typical design and shape of a reversible wiper 91 using teflon or other rigid but non-abrasive material. It is bolted on to a wiper mount 92 with stainless steel carriage-head bolts 93 with locking nut 94. The wiper mount 92 has square holes to keep the carriage bolts 93 from rotating. The reversible wiper 91 should have slotted holes 95, so that as the wiper wears it can be advanced down its slot in order to maintain close proximity to the milli-screen. When it reaches the end of the slot, the wiper may be turned over and the new face utilized.

The upstream side of the wiper may be used to fasten in place the downstream edge of the milli-screen 70 as shown in FIG. 16.

As illustrated in FIGS. 3 and 6, the tank 48 is provided with one or more steam jackets 49 for controlling the temperature of the extraction liquid during diffusion.

Referring to FIG. 5, which shows the upper end of the slope diffuser, the subdivided solids are pushed by the scroll flights 43 above the liquid level 63 toward the lower wall 64 in Zone A and up the inclined de-watering ramp 65 in Zone B toward the upper wall 69 to the feed discharge 42. The feed discharge 42 contains a screw conveyor(s) 66 for removing the spent solids from the diffuser. Attached to the shaft 60 is a wiper 62 for cleaning and removing the solids from wall 64 and to better position the solids for discharge in Zone B.

Although the liquid level shown in FIG. 5 is at the bottom of Zone A, in some cases of rapid drainage the liquid level may be at a higher level, even approaching the bottom of Zone B, without adverse effects.

As the solid materials are moved into Zone A, and then into Zone B, they are compressed by the pushing action of the scrolls 43 against the de-watering ramp 65 and against the de-watering wall 69, and the extraction liquid in the solids is caused to be partially squeezed out, and drained, prior to the solids being discharged at 42.

It will be noted that the flights 43 at the upper end of the conveyor are provided on the upstream faces thereof with milli-screens 70. The milli-screens prevent the small particles and fines from passing therethrough in substantial amounts and thereby force the small particles and fines along with the large particles and fibers into Zones A and B to be compressed and dewatered, and then discharged with the solids. In this respect the present invention differs from prior diffuser systems in which without the milli-screen the small particles and fines would be squeezed through the large openings in the scroll flights and washed downstream when placed under compression.

Figure 7:
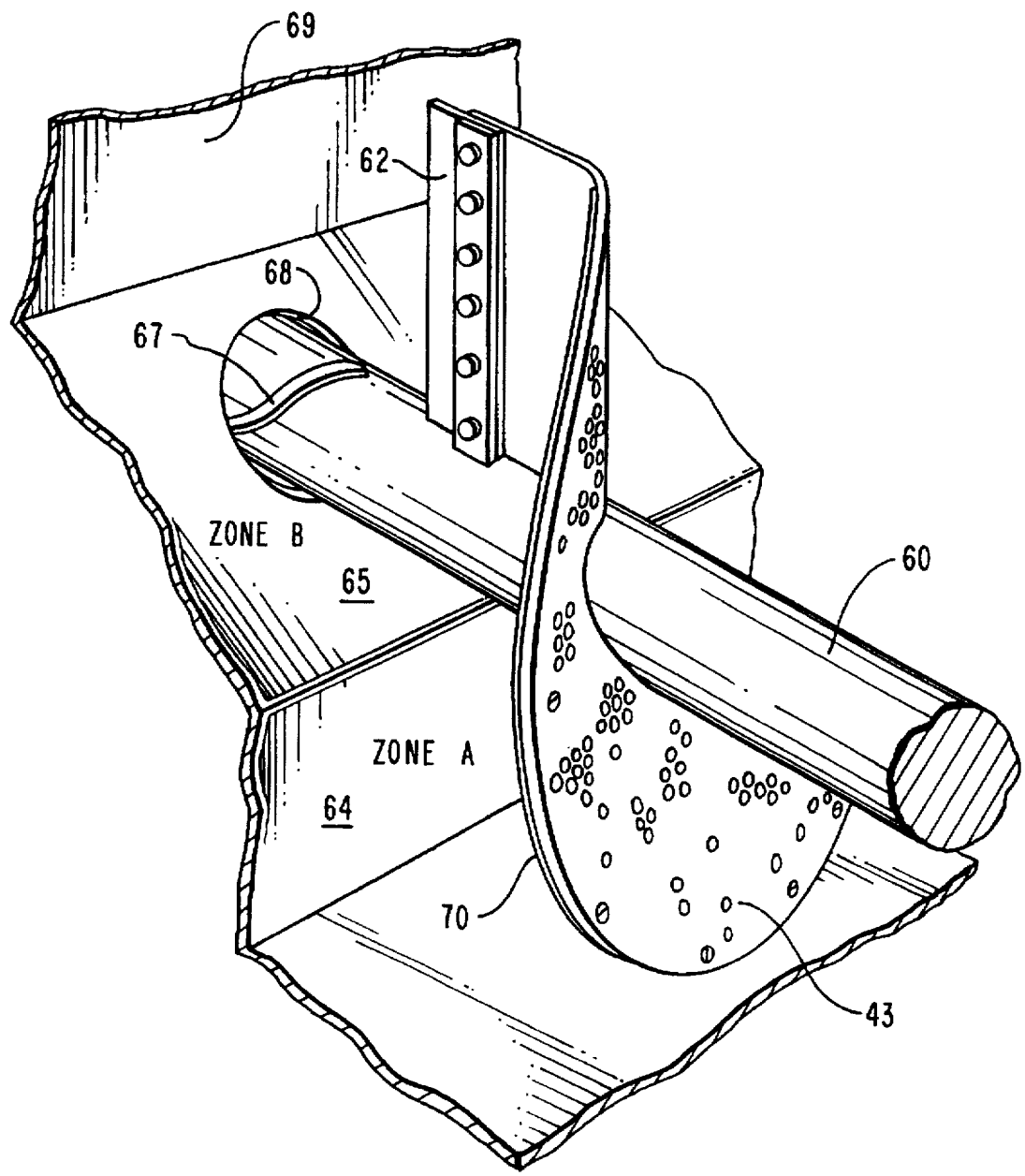
FIG. 7 is an enlarged view in perspective of the solids discharge end of the slope diffuser illustrated in FIG. 5.

Referring to FIG. 7, there is shown an enlarged fragmentary view of the discharge area described in connection with FIG. 5. As shown in both FIGS. 5 and 7, the shaft 60 as it passes through the de-watering ramp wall 65 is provided with cleanup flights 67 of a helical configuration for pushing solids away from the opening 68 in wall 65.

Figure 8:
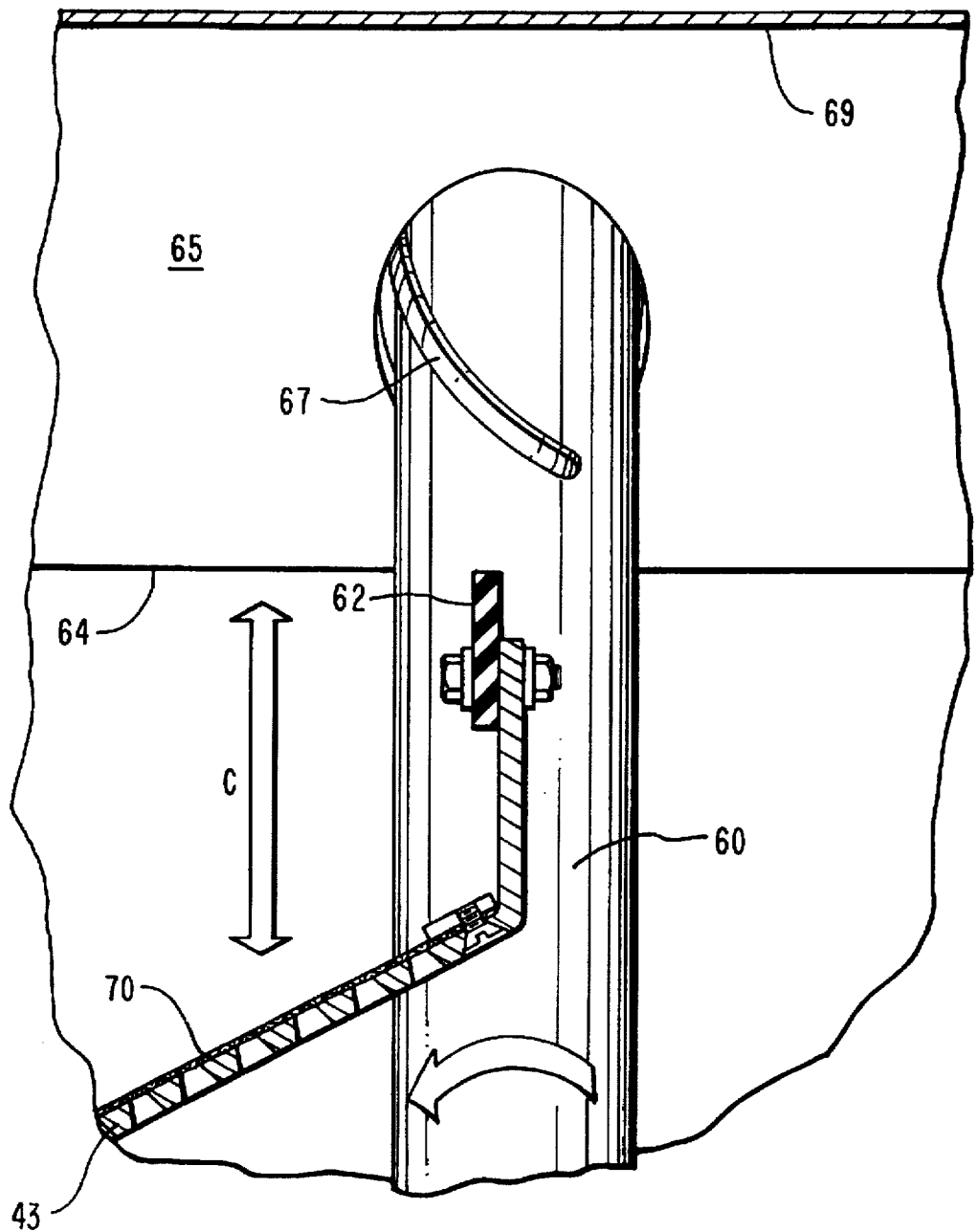
FIG. 8 is a top plan view in perspective of the solids discharge end of the slope diffuser illustrated in FIG. 5 showing the dewatering area.

FIG. 8 is a top plan view of the upper end of the slope diffuser showing what is depicted in FIGS. 5 and 7 in more detail. The arrow C indicates the area in which the spent solids are compressed between wall 64 and the end flight 43 and the milli-screen 70 to remove at least some extraction liquid.

Referring now to FIG. 9, there is shown in diagrammatic form one way in which the milli-screen 70 may be mounted and supported for use on the flights 43 of the scroll conveyor, end the separator screen 44. Also illustrated in FIG. 9 is a retention of particles, small particles and fines which collect as a mat or matrix on the upstream face of the milli-screen 70. The milli-screen 70 is provided with a plurality of milli-sized openings 71. By milli-size opening is meant openings in which the size is less than about 0.095 inches across. The milli-size openings are preferably from 0.001 inch to about 0.095 inches across, desirably from about 0.002 inches to about 0.075 inches across, and most desirably from about 0.0025 inches to about 0.060 inches across on the upstream side. The milli-size openings are provided on their downstream side with a configuration to ease the passage of liquids, in order to provide a self-cleaning feature to the upstream face of the milli-screen 70. As shown in FIG. 9, the milli-screen on the downstream side has larger openings 72 than on the upstream side 71 in order to facilitate the flow of liquid therethrough, and to reduce clogging of the passages. The milli-screen is supported by a rigid plate screen 73 also provided with openings 74 for passage of liquid therethrough. It should be noted that the plate screen my be of various shapes and sizes to provide required support to milli-screens with adequate openings to pass liquid. Again, the plate screen openings are larger on the downstream side so as to facilitate the passage of liquid and to reduce clogging of the passages.

The rigid plate screen 73 may be from about ⅛ inch to ½ inch thick and provided at the upstream side with holes of from ⅛ inch to ½ inch in diameter on the upstream side. The milli-screen may be fastened to the rigid plate screen in any suitable manner, for example, as illustrated in FIG. 9, a clamp strip 78 with bolts 79 and lock nuts 89 can be used for this purpose.

It should be noted that between the openings 74 in the plate 73 the milli-screen is contacted by a solid portion 75 of the plate 73, an arrangement which tends to reduce the flow of liquid.

Several methods may be used to increase the flow of the liquid through the milli-screen in the area of the solid portion of the plate 73. One technique is to scribe or score the solid portion of the plate 73 in the area 75 immediately under the milli-screen to provide channels for the liquid to flow.

Another method is shown in FIG. 10 in which a calendered backup screen 80 is provided between the milli-screen 70 and the plate screen 73. As shown, the milli-screen is placed against the calendered backup screen 80 which is supported by the plate screen 73. A liquid path through the milli-screen and the calendered backup screen through openings 74 in the plate screen is thereby facilitated, as illustrated by the arrows.

The plate screen 73 can be a casting, a fabricated supporting grid, or a punched or drilled steel plate. The openings 74 may be rectangular or square rather than round, or they may assume any other desirable configuration, the main requirement being to adequately support the milli-screen and allow passage of the extraction liquid.

The extraction efficiencies of the diffuser depend upon rapid hydration of the solids. Some subdivided solids tend to float on the surface of the liquid and thereby reduce the extraction efficiencies. An optional hydrating foil 82 shown in FIG. 11 is designed to submerge floating solids and shorten the time in which hydration takes place.

Figure 11:
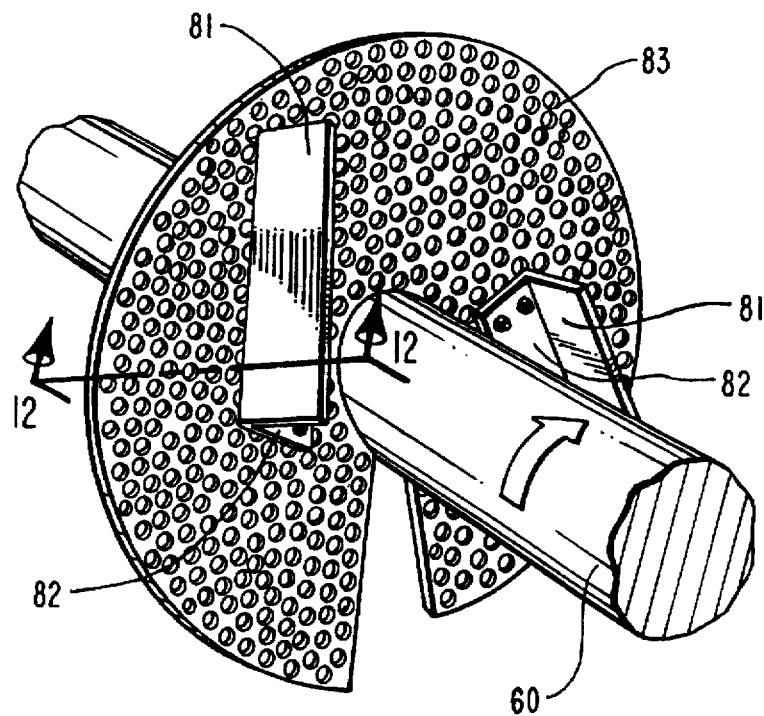
FIG. 11 is a perspective view of a hydrator having a hydrating foil that may be optionally used in connection with the present invention.

Referring to FIG. 11, hydrating foils 82 are mounted on a rotating plate screen 83 which is rotated by the shaft 60. The hydrating foils are provided with a flange 81 which projects outwardly from the flight 83 for submerging subdivided solids floating near or on the surface of the extraction liquid.

Figure 12:
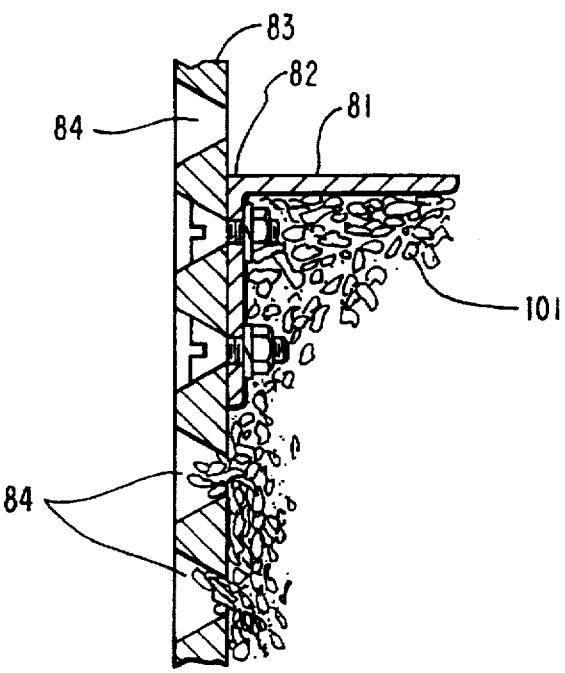
FIG. 12 is a view taken along line 12—12 of FIG. 11.

FIG. 12 taken along line 12—12 of FIG. 11 shows the action of the hydrating foil 82 during operation. As depicted, the flange 81 captures and immerses the subdivided solids 101 below the surface of the liquid. It will be noted that the scroll flight 83 shown in FIG. 12 is not provided with a milli-screen, but only with a plate screen having openings 84. The plate screen is effective to trap the larger solid particles. Some of the larger solid particles are contained in the holes 84 of the plate screen and are thereby submersed in the extraction liquid. The plate screen 83 as shown in FIG. 12 thus has two functions: it pushes the subdivided solids along the path from the solids feed to the solids discharge, and assists in hydrating the solids by submerging them in the extraction liquid.

The optional hydrating foils 82 preferably are located directly upstream of the feed 41 of the slope diffuser 40 in FIG. 2. By locating the hydrating foils directly upstream of the solids inlet, the foils will contact floating solids and immediately submerge them below the surface of the extraction liquid and will not block the feed. It has been found that by hydrating the solids directly in the diffuser, rather than by hydrating in a batch process prior to introduction of solids into the diffuser, there is a greater concentration of the soluble substances in the extraction liquid. Hydrating in the slope diffuser produces a much richer extraction liquid. With vertical and horizontal diffusers the separate continuous hydrators are equally as efficient.

The foregoing description of the operation of the slope diffuser 40, shown in FIGS. 2 through 12, and FIGS. 14 through 16 makes apparent the principles of the invention. Referring to FIG. 2, the solids are first subdivided by a comminutor 10 using devices, the specific design of which depends upon the solids to be processed. In the case of beet sugar or cane sugar the solids are sliced. In the case of madder root or indigo root a pulverizer, such as a Jay Bee pulverizer, may be used. The subdivided solids are conveyed to the inlet 41 of the diffuser at a rate controlled by regulator 32. As the solids enter the diffuser they contact extraction liquid and are hydrated in the diffuser 40. Preferably a hydrating foil, or similar system for immersing the solids, is employed to submerge the solids below the surface of the liquid. Solids are conveyed by scroll flights 43 from the feed inlet 41 to the solids outlet 42. The scroll flights have on the upstream side thereof milli-screens which contain openings sufficiently small to prevent passage therethrough of small particles and fines. Extraction liquid is introduced at inlet 45 and removed at outlet 46. Prior to removal of the extraction liquid, the liquid passes through a separator screen 44 which on the upstream side thereof is provided with a milli-screen. The milli-screen as used on the upstream side of the scroll flights 43 and on the upstream side of separator screen 44 is described in connection with FIGS. 9 and 10.

The liquid extraction medium may be selected from a variety of solvents which extract the desired substances from the solids. Water and water base solvents are preferred, but persons skilled in the field of extraction will recognize other useful solvents for extraction,. including inorganic and organic compounds.

Heretofore, the comminution of the solids for diffusion had as an objective the creation of a minimum amount of small particles and fines. In the present invention however the small particles and fines are controlled to increase the extraction efficiencies. Moreover, the invention permits a wider variety of materials to be diffused or extracted by continuous diffusion than has been practicable heretofore. Accordingly, the small particles and fines employed in the process of the present invention are usually more than 3% by weight, preferably at least about 5% by weight, more preferably at least about 7.5% by weight, and most desirably at least 10% by weight of the subdivided solids entering the diffuser. As shown by the following examples, the diffuser works satisfactorily, and in some cases with increased efficiency, with fines in excess of 15% or 20% by weight of the subdivided solids. Also, heretofore, while it has been a practice in some cases to hydrate the subdivided solids prior to diffusion or extraction, one of the optional features of the present invention is to provide hydration within the diffuser, and immediately upon the entrance of the subdivided solids into the diffuser, as explained in connection with FIGS. 11 and 12 hereinabove.

The solids introduced in the diffuser may be introduced in a dry or wet form. In wet form, the solids may be introduced, for example, in a slurry, in a puree, in a syrup, or in other liquid or semi-liquid forms.

The following examples are given in order to more fully illustrate the invention, and not as limitations thereon.

EXAMPLE I

Madder root was subdivided in a Jay Bee Pulverizer using a ¼ inch diameter hole grate. The subdivided materials contained approximately 10 percent by weight of fines and small particles and the remainder larger chunks of madder root, as determined by visual inspection. The madder root so prepared was fed to the solids inlet of the slope diffuser at a rate of 1 pound of madder root per minute. Water was introduced into the liquid inlet at a rate of 2⅛ gallons per minute. The madder root hydrated in the diffuser at the solids inlet section, and absorbed approximately 4 pounds of water per pound of madder root. The action of the madder root in the diffuser was effective in producing good countercurrent extraction.

The slope diffuser was of the type shown in FIG. 2, using a milli-screen 22 with 0.005 inch diameter holes and milli-screens 70, some of which were stainless steel (with and without chrome plating) having 0.005 diameter holes and some of which were nickel built-up with chrome plating having 0.0025 inch width slots. As the extracting liquid was withdrawn from outlet 46 and increased in color and concentration, the hydration of the madder root became more effective. The temperature in the diffuser was maintained at 170° F. during most of the first two hours. During the last hour the temperatures were raised to 180° F. The higher temperature was more effective in the extraction. The sample extract being discharged at 46 at the beginning of the operation was weak, but after 100 gallons had been produced, the color was very good, and after 200 gallons the color was a brilliant red.

There was no measurable residual color in the spent madder root as discharged at the spent solids discharge 42.

EXAMPLE II

Two hundred pounds of indigo consisting of 90 percent by weight stock and about 10 percent leaf content was processed in a Jay Bee Pulverizer. A ¼ inch diameter hole grate was used. Fiber lengths produced by the Jay Bee Pulverizer were between ¼ inch and ½ inch in length. The amount of small particles and fines was about 8% by weight as determined by visual inspection. No visual identification of the 10 percent leaf content in the subdivided solids could be made.

Laboratory tests were run to determine hydration properties, and found that 10 grams of prepared indigo material required 19 grams of water to saturate. When water was poured on the indigo it did not float.

Testing began in the slope diffuser shown in FIG. 3 by feeding five pounds of subdivided indigo per minute with 2 gallons per minute of water introduced in the liquid inlet. The dry indigo floated on top of the water in the diffuser, and did not hydrate until it had reached approximately ½ way up the diffuser. Hydration was assisted by manually pushing the indigo material under the liquid. As a concentration of extract built up, hydration occurred more quickly and naturally, and at the end of 46 minutes, hydration was taking place in the first ¼ length of the diffuser. The processing temperatures were maintained at 170° F. The indigo gave up its color quickly and a rich-looking reddish purple extract was discharged from liquid outlet 46.

EXAMPLE III

Osage orange woodchip material was subdivided by finely-grinding in a Jay Bee Pulverizer. The amount of fines and small particles was about 10% by weight as determined by visual inspection. The subdivided material was introduced into the slope diffuser shown in FIGS. 3–11 with temperatures of the water at about 170° F. During the entire operation about 2.616 pounds of water were used per pound of osage orange solids. At steady state running of the diffuser, it was estimated that there were 1.837 pounds of liquid extract per pound of osage fed. The liquid extract had a very deep orange color.

EXAMPLE IV

The slope diffuser shown in FIGS. 2–12 was employed to extract sugar from cush-cush, except that the milli-screen was not used on the scroll flights, but only at separator screen 44. The fiberized cush-cush from DSM screens was poured into the diffuser at the solids inlet at regular intervals. By visual observation, the amount of small particles and fines in the cush-cush was 20% by weight. Hot water was added at the liquid inlet end of the diffuser starting at 10 gallons per minute and dropping to two gallons per minute at the end of the test. Samples of cush-cush entering and discharging from the diffuser were taken and analyzed. The percent of sugar of the cush-cush entering in the first sample was 6.67% percent and the moisture of the cush-cush was 83%. The cush-cush exiting the diffuser in the second sample was five parts per million (ppm) of sugar and a moisture of 82 percent. The cush-cush exiting the diffuser in the third sample was at 2 ppm of sugar and a moisture of 84 percent.

The percentage of sugar in the extraction liquid varied from 3.4 percent, and a purity of 65.38, to a low of 1.93 percent of sugar and a purity of 60.31. As the supply water was decreased near the end of the test, the percentage of sugar in the liquid extract was 3.38 percent and a purity of 73.47. The cush-cush discharge from the diffuser at point 42 showed a percentage of sugar of 1.93 percent and a moisture of 89 percent.

The test established:

(1) that the diffuser of the invention could extract sugar from the cush-cush to a remarkable degree (down to parts per million, instead of the 2 to 3 percent sugar that usually was found in the bagacillo after the mill final extraction), (2) that the diffuser of the invention could dewater the cush-cush after the extraction took place to approximately the same moisture as cush-cush from the DSM Screens (except in one sample where the juice level in the diffuser was allowed to get too high), and (3) that the physical handling of the cush-cush by twin scrolls of the diffuser of the invention would provide a trouble free countercurrent extraction of sugar from cush-cush.

EXAMPLE V

The cochineal insect was extracted using the extraction apparatus and process of the invention. The cochineal were prepared with a Jay Bee Pulverizer. The pulverizer produced a large percentage of small particles and fines. The pulverized product contained about 90% by weight of small particles and fines as determined by visual inspection. The subdivided product was introduced into the slope diffuser shown in FIGS. 3–11 at the solids inlet and hot water was introduced into the liquid inlet.

A good color liquid extract was obtained.

Because of the large amount of fines, the cochineal as prepared by the Jay Bee pulverizer was too amorphous to be pushed above Zone A into Zone B of FIG. 5. For the test to provide positive discharge of the cochineal, spent madder root was added to the feed end of the diffuser and as an inert carrier conveyed the cochineal up to scroll 66 of FIG. 5.

Subsequently experimentation was done with preparing the cochineal by feeding it through a comminutor composed of a mill of two serrated, different-diameter cylinders rotating at different speeds which cracked the cochineal and did not produce so many fines.

Another method of operating for the extraction of dye material from cochineal would be, in referring to FIG. 5, to remove the cochineal at the point of the extract liquid inlet, and to introduce the extract liquid at a point some six to eight inches to the right (downslope) of its present introduction.

Another way of extracting the dye from the cochineal is to utilize the batch extraction process of FIG. 1E.

From the foregoing it is clear that the process and apparatus of the invention can be used with plant (Examples I–IV) and with animal materials (Example V).

In addition to the examples given above, other materials can be suitably extracted using the process and apparatus of the present invention, as illustrated in the following Table.

TABLE

| Example | Base Material | Products Of The Extraction Process |
| --- | --- | --- |
| VI | Yucca plant | Anti-foaming agent |
| VII | Yew tree bark and needles | Taxol (drug) |
| VIII | Sunflower hull | Food coloring |
| IX | Almond hull | Sugars |
| X | Larch tree | Oleoresin |
| XI | Jerusalem artichoke | Inulin, medicine |
| XII | Crocus plant | Dye (Saffron), medicines, seasoning |
| XIII | Henna plant | Dye |
| XIV | Beech tree | Xylitol |
| XV | Sorghum plant | Sugar |
| XVI | Logwood plant | Dye |
| XVII | Mediterranean Mollusk | Dye (Tyrian purple) |
| XVIII | Dahlia plant | Inulin, medicines |
| IXX | Sugar beets | Sucrose |
| XX | Sugar Cane | Sucrose |
| XXI | Mignonette plant | Dye |
| XXII | Pomegranate skins | Dye |
| XXIII | Vine leaves | Dye |
| XXIV | lemon peels | Sugars, Pectin |
| XXV | Lime peels | Sugars, Pectin |
| XXVI | Chrysanthemum plant | Insecticide and medicine |
| XXVII | Alfalfa | Proteins |
| XXVIII | Apples | Aromas & Juice |
| XXIX | Apricots | Aromas & Juice |
| XXX | Grapes | Aromas & Juice |
| XXXI | Peaches | Aromas & Juice |
| XXXII | Neem Plant | Azadiractin |
| XXXIII | Palm Dates | Fructose, Glucose, Sucrose, or Combinations of the foregoing |
| XXXIV | Chicory | Inulin, medicines |

As indicated by the examples above, the process of the invention can be used to extract soluble substances from a wide variety of plant and animal materials. Ordinarily, the liquid extracting medium, normally water, or a water based medium, as used in the process and apparatus of the invention will be heated to temperatures above ambient, and said temperatures may range from slightly above ambient to about 210° F. The temperatures of the extracting medium will be chosen with due regard to the composition of the solids being treated.

From the foregoing, the advantages and benefits of this invention should be apparent to those skilled in the extraction field. The disadvantages of current practice with existing equipment will be reviewed. The advantages of current practice with existing equipment will be reviewed. The advantages of use of the milli-screen will then be explained in a summary section below.

The separator screen 44 as is currently used in all continuous diffusers (and the non-existence of any separator screen in most batch diffusers) is ineffective in keeping small particles and fines out of the liquid discharge compartment. The liquid discharge compartment traditionally serves only as a collecting compartment of liquid and sometimes as a means to control the level of liquid in the diffuser. Correct level control is sometimes a problem because of plugging of the separator screen, line, or control valve by cossettes, weeds, gravel, etc.

Furthermore, because in the sugar beet industry many cossettes, whole or broken, pass through the separator screen along with small particles and fines from sugar beets and weeds and soils, there is an additional process, external to the diffuser, of "juice screening" to remove cossettes, small particles, and fines from the extraction liquid. This raises a problem of cooling of the juice that adds to the energy costs of processing.

The biggest problem is what to do in the process with "screened" cossettes, weeds, small particles and fines which are still, or now, rich in sucrose which if added back into the diffuser will only tend to diminish diffuser performance and tend to blind the diffuser separator screen additionally. The returned cossettes become mushy from being at an elevated temperature longer than the forty or fifty minutes that is optimal for extraction before the integrity of cell walls begins to be compromised. Often this "screened material" is sent to the pressing station where the sucrose is mostly lost.

It is standard practice in the industry, if the separator screen becomes "plugged," to change the knives in the slicers so that "slabs" of sugar beets, instead of the "shoestring" like cossettes, are produced. These "slabs" (sections of sugar beets about ⅛th inch thick, 3" to 4" wide, and perhaps 6" long) work their way to the separator screen and in conjunction with the rotating screen wipers "wipe" the "mushy cossettes" off the separator screen face and allow the "extraction liquid" to pass into the "liquid discharge compartment." It is difficult to diffuse sucrose out of "slabs" of sugar beets so losses of sucrose are sustained in the extraction process when these "slabs" are produced in the slicing station.

SUMMARY SECTION

A. In accordance with the present invention, the large hole screen or supporting grid 44 (as shown in FIG. 2, as 33 in FIGS. 1A and 1B, and as 133 in FIGS. 1C, 1D, and the head cell of 1E, and as 177 in FIGS. 1G and 1H) is provided on the upstream side with a milli-screen 22 (18 in the hydrator in FIGS. 1A and 1B, 22 in the vertical diffuser in FIG. 1A, 26 in the horizontal diffuser in FIG. 1B, 122 in FIGS. 1C, 1D, and the head cell of 1E, and 176 in FIGS. 1G and 1H). The milli-screen used in conjunction with a downstream chamber, or liquid compartment, provides the following advantages in extracting soluble solids from subdivided particles:

1) Milli-screen 22 provides a positive separation of subdivided solids from the extraction liquid stream before the liquid is discharged from the unit. This positive separation with in the machine a) eliminates another separate and distinct process of separation, b) decreases energy requirements, and c) increases extraction efficiency.

2) Milli-screen 22 provides a positive, self-cleaning passage for the extracting liquid to pass into the liquid compartment (which also can be called the "screened liquid discharge compartment") despite the presence of small particles and fines. In the past these particles have tended to partially block or have blocked entirely the passage of extracting liquid.

3) Milli-screen 22 provides a very smooth, even, easily-wiped surface whose holes can be readily cleaned of overlaying materials with a screen wiper. Because of the smooth, easily sliding surface of the milli-screen (especially when lubricated during operation with the extracting liquid), a non-abrasive "scrapper" such as teflon can be used as the wiper material. This helps maintain the integrity of the milli-screen and decreases maintenance requirements.

4) Milli-screen 22, by preventing particles larger than the size of the holes (or slots) in the screen from passing through, allows the screened extracting-liquid compartment to serve as a chamber for back-flushing liquid. The liquid level in the "screened liquid discharge compartment" can be raised above the level of liquid in the diffuser and the resulting "hydraulic head" will float off the upstream surface of milli-screen 22 any overlaying materials. In current diffusers, back-flushing usually just further plugs the "separator screen" and so is not usually practiced in the industry. In the design of this invention back-flushing is possible because there are no small particles, nor large particles, and very few fines, that "wash" against the back-side of the screen during the back-flushing operation.

5) The screened liquid discharge compartment provides a liquid hydraulic back pressure to milli-screen 22 that keeps the hydraulic gradient across milli-screen 22 approximately zero. This prevents subdivided solids from being "plastered" against the upstream face of milli-screen 22 by hydraulic pressure which then turns milli-screen 22 into a veritable dam rather than a strainer or screen for the extraction liquid.

6) Milli-screen 22, by preventing large particles, small particles, and fines from passing into the screened liquid discharge compartment, provides superior liquid level control for the diffuser as explained previously. If small particles, fines, and especially large particles were present in either the overflow design (see FIG. 3, pipe 54) or automatic level control valve design, the discharging liquid stream would be subject to "choking" and the control of diffuser level would not be as effective or consistent.

B. In accordance with the present invention, the partitioned cells of the horizontal diffuser 25 (FIG. 1B) and of the ST Extractor 180 (FIG. 1F) and the liquid continuously refed to cells 134 or 135 of the batch diffuser (FIGS. 1C, 1D and 1E) become multiple extraction steps in diffusion. These cells have the advantage of having extraction liquid free of subdivided solids, small particles, and most fines entering the cell (from a screened liquid discharge compartment from the previous cell). Because of the strategically located milli-screen 70 mounted over supporting grid or screen 30 (shown in FIG. 1B, or as 183 in FIG. 1F or as milli-screen 122 mounted over supporting screen 133 in FIGS. 1C, 1D and 1E) the advantages in extracting soluble solids from subdivided particles as listed in Section A (except for advantage (6) which does not apply) are multiplied by the number of individual cells utilized.

C. In accordance with the present invention, milli-screens 70 also may be added to the scroll flights of the vertical diffuser (FIG. 1A, with flight segments 23), of the slope diffuser (FIG. 2, flights 43), and of the hydrator (FIGS. 1A and 1B, flights 28). These milli-screens added to the scroll flights essentially partition the unit into separate divisions, allowing much more efficient countercurrent extraction steps in an overall continuous diffusion extraction of soluble solids from subdivided solids. Efficiencies of operation are increased because of the advantages listed in Section A which increase the quality and quantity of extracted soluble solids significantly. Under Section A, item (3), the subdivided solids themselves become the screen wipers and continuously wipe the upstream surface of the milli-screen as long as material is fed to the diffuser.

D. In accordance with the present invention, the use of the milli-screens in one or several locations allows extraction by liquids of soluble solids from subdivided solids containing significant amounts of small particles and fines.

The specifications, drawings, and examples are presented above to aid in understanding the invention, but not as limitations thereto. Many variations and modifications of the invention can be made without departing from the spirit and scope of the invention as set forth in the following claims.

I claim:

1. A process for extracting soluble substances from subdivided solids containing small particles and fines, said process employing at least one tank having first and second portions, at least one discharge outlet for the withdrawal of enriched extraction liquid from the at least one tank, at least one milli-screen, said at least one milli-screen having an upstream face and a downstream face with respect to the flow of liquid medium when the liquid medium is withdrawn through said at least one discharge outlet, a plurality of discrete milli-openings extending from the upstream side to the downstream side of said at least one milli-screen, said milli-openings comprising sizes less than about 0.095 inches across on the upstream side of the said at least one milli-screen, said process comprising the steps of:

introducing subdivided solids into a first portion of the at least one tank;

said subdivided solids containing fines;

said fines containing substances that can be extracted with a liquid medium;

introducing liquid extraction medium into a second portion of the at least one tank;

contacting the subdivided solids with the upstream face of said at least one milli-screen;

pushing the subdivided solids including small particles and fines toward the second portion of the at least one tank with said at least one milli-screen so that said subdivided solids move countercurrent to the flow of the liquid extraction medium;

separating at least some of said fines from the liquid extraction medium with said at least one milli-screen; and withdrawing the enriched extraction liquid from the first portion of the at least one tank; and withdrawing the spent subdivided solids from said second portion of the at least one tank.

2. The process of claim 1 in which said subdivided solids contain more than about 3% by weight of fines.

3. The process of claim 1 in which said subdivided solids contain at least about 5% by weight of fines.

4. The process of claim 1 in which said subdivided solids contain at least about 10% by weight of fines.

5. The process of claim 1 in which said subdivided solids contain at least about 20% by weight of fines.

6. The process of claim 1, 2, 3, 4, or 5 in which said subdivided solids comprise animal materials.

7. The process of claim 1, 2, 3, 4, or 5 in which the subdivided solids comprise cochineal insect.

8. The process of claim 1, 2, 3, 4, or 5 in which said subdivided solids comprise plant materials.

9. The process of claim 1, 2, 3, 4, or 5 in which said subdivided solids comprise materials selected from the class consisting of yew bark and yew needles.

10. The process of claim 1, 2, 3, 4, or 5 in which said subdivided solids comprise Jerusalem Artichokes.

11. The process of claim 1, 2, 3, 4, or 5 in which said subdivided solids comprise materials selected from the class consisting of sugar beet and sugar cane.

12. The process of claim 1, 2, 3, 4, or 5 in which said subdivided solids comprise madder root.

13. The process of claim 1, 2, 3, 4, or 5 in which said subdivided solids comprise dahlia plant materials.

14. The process of claim 1, 2, 3, 4, or 5 in which said subdivided solids comprise chicory.

15. A process for extracting soluble substances from subdivided solids containing small particles and fines, said process employing at least one tank, at least one discharge outlet for the at least one tank for the withdrawal of enriched extraction liquid, at least one milli-screen in the at least one tank, said at least one milli-screen having an upstream face and a downstream face with respect to the flow of liquid medium when the liquid medium is withdrawn through said at least one discharge outlet, a plurality of discrete milli-openings extending from the upstream side to the downstream side of said at least one milli-screen, said milli-openings comprising sizes less than about 0.095 inches across on the upstream side of said at least one milli-screen, said process comprising the steps of:

introducing subdivided solids into the at least one tank, said subdivided solids containing at least about 5% by weight of fines, said fines containing substances which can be extracted with a liquid extraction medium;

introducing liquid extraction medium into the at least one tank for extracting substances from the fines;

providing contact between said subdivided solids and said at least one milli-screen;

separating at least some of said fines from the liquid extraction medium with said at least one milli-screen;

withdrawing the enriched extraction liquid medium from said at least one tank; and removing spent subdivided solids together with the small particles and fines from the at least one tank.

16. The process of claim 15 in which said milli-screen is wiped to remove any accumulated fines.

17. The process of claim 15 in which said subdivided solids contain at least about 7.5% by weight of fines.

18. The process of claim 15 in which said subdivided solids contain at least about 10% by weight of fines.

19. The process of claim 15 in which said subdivided solids contain at least about 20% by weight of fines.

20. The process of claim 15, 16, 17, 18, or in which said subdivided solids comprise animal materials.

21. The process of claim 15, 16, 17, 18, or 19 in which the subdivided solids comprise cochineal insect.

22. The process of claim 15, 16, 17, 18, or 19 in which said subdivided solids comprise plant materials.

23. The process of claim 15, 16, 17, 18, or 19 in which said subdivided solids comprise materials selected from the class consisting of yew bark and yew needles.

24. The process of claim 15, 16, 17, 18, or 19 in which said subdivided solids comprise Jerusalem Artichokes.

25. The process of claim 15, 16, 17, 18, or 19 in which said subdivided solids comprise materials selected from the class consisting of sugar beet and sugar cane.

26. The process of claim 15, 16, 17, 18, or 19 in which said subdivided solids comprise madder root.

27. The process of claim 15, 16, 17, 18, or 19 in which said subdivided solids comprise dahlia plant materials.

28. The process of claim 15, 16, 17, 18, or 19 in which said subdivided solids comprise chicory.

29. A process for extracting soluble substances from subdivided solids containing small particles and fines, said process employing at least one tank, at least one milli-screen in the at least one tank, said at least one milli-screen having an upstream face and a downstream face with respect to the flow of liquid medium when the liquid medium is withdrawn through the discharge outlet, a plurality of discrete milli-openings extending from the upstream side to the downstream side of said at least one milli-screen, said milli-openings comprising sizes less than about 0.095 inches across on the upstream side of said at least one milli-screen, at least one compartment located downstream from said at least one milli-screen, at least one discharge outlet in the said at least one compartment for the withdrawal of enriched extraction liquid, said process comprising the steps of:

introducing subdivided solids into at least one tank, said subdivided solids containing more than about 3% by weight of fines, said fines containing substances which can be extracted with a liquid extraction medium;

introducing liquid extraction medium into the at least one tank for extracting substances from the fines;

providing contact between said subdivided solids and said at least one milli-screen;

conducting at least a portion of the extraction liquid medium into said at least one compartment;

separating at least some of said fines from the liquid extraction medium with said at least one milli-screen;

withdrawing the enriched extraction liquid medium from said at least one compartment; and removing spent subdivided solids together with the small particles and fines.

30. The process of claim 29 in which said subdivided solids contain at least 5% by weight of fines.

31. The process of claim 29 in which said subdivided solids contain at least about 7.5% by weight of fines.

32. The process of claim 29 in which said subdivided solids contain at least about 10% by weight of fines.

33. The process of claim 29 in which said subdivided solids contain at least about 20% by weight of fines.

34. The process of claim 29, 30, 31, 32, or 33 in which said subdivided solids comprise animal materials.

35. The process of claim 29, 30, 31, 32, or 33 in which the subdivided solids comprise cochineal insect.

36. The process of claim 29, 30, 31, 32, or 33 in which said subdivided solids comprise plant materials.

37. The process of claim 29, 30, 31, 32, or 33 in which said subdivided solids comprise materials selected from the class consisting of yew bark and yew needles.

38. The process of claim 29, 30, 31, 32, or 33 in which said subdivided solids comprise Jerusalem Artichokes.

39. The process of claim 29, 30, 31, 32, or 33 in which said subdivided solids comprise materials selected from the class consisting of sugar beet and sugar cane.

40. The process of claim 29, 30, 31, 32, or 33 in which said subdivided solids comprise madder root.

41. The process of claim 29, 30, 31, 32, or 33 in which said subdivided solids comprise dahlia plant materials.

42. The process of claim 29, 30, 31, 32, or 33 in which said subdivided solids comprise chicory.

* * * * *

UNITED STATES PATENT AND TRADEMARK OFFICE
CERTIFICATE OF CORRECTION

PATENT NO.    : 5,700,464
DATED         : December 23, 1997
INVENTOR(S)   : Barnard Stewart Silver It is certified that error appears in the above-identified patent and that said Letters Patent is hereby corrected as shown below:

In claim 20, line 1, after "or" insert --19--.

Signed and Sealed this

Seventh Day of March, 2000

Attest:

*Attesting Officer*

Q. TODD DICKINSON

*Commissioner of Patents and Trademarks*